United States Patent
Minato et al.

(10) Patent No.: US 9,508,192 B2
(45) Date of Patent: Nov. 29, 2016

(54) IMAGE PROCESSING DEVICE, IMAGE PROCESSING METHOD, AND IMAGE PROCESSING PROGRAM

(71) Applicant: OMRON CORPORATION, Kyoto (JP)

(72) Inventors: Yoshihisa Minato, Kyoto (JP); Yuhki Akatsuka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 58 days.

(21) Appl. No.: 14/602,565

(22) Filed: Jan. 22, 2015

(65) Prior Publication Data

US 2015/0262414 A1    Sep. 17, 2015

(30) Foreign Application Priority Data

Mar. 14, 2014   (JP) ................................ 2014-051328

(51) Int. Cl.
  *G06T 15/00*    (2011.01)
  *G06T 17/00*    (2006.01)
  *G06K 9/62*     (2006.01)
  (Continued)

(52) U.S. Cl.
  CPC ............. *G06T 17/00* (2013.01); *G06K 9/6204* (2013.01); *G06K 9/6211* (2013.01); *G06T 7/004* (2013.01); *G06T 7/0083* (2013.01); *G06T 7/0089* (2013.01); *G06T 11/60* (2013.01);
  (Continued)

(58) Field of Classification Search
  CPC ....... G06T 7/004; G06T 11/60; G06T 17/00; G06T 2207/30164; G06T 7/0083; G06T 7/0089; G06T 2207/20092; G06K 9/6204; G06K 2209/19; G06K 9/6211

USPC .................................................. 345/419, 420
  See application file for complete search history.

(56) References Cited

U.S. PATENT DOCUMENTS

| 6,424,734 | B1 | 7/2002 | Roberts et al. | |
| 7,664,566 | B2 * | 2/2010 | Tasker | H01J 37/28 700/166 |

(Continued)

FOREIGN PATENT DOCUMENTS

| EP | 2827131 | 1/2015 |
| JP | 2013-156094 | 8/2013 |
| WO | 2013/136591 | 9/2013 |

OTHER PUBLICATIONS

U.S. Appl. No. 14/625,968 to Erina Kawabata et al., filed Feb. 19, 2015.

(Continued)

*Primary Examiner* — Phu K Nguyen
(74) *Attorney, Agent, or Firm* — Greenblum & Bernstein, P.L.C.

(57) ABSTRACT

The invention provides the image processing device that can shorten a time required for setting a parameter. The invention provides the image processing device that searches an input image for a feature amount based on a feature amount included in a model image. The image processing device includes: the hardware for holding a feature amount of a feature portion of the model image; the search-range reception module for receiving a setting value indicating a size of a range of searching the input image for a feature amount corresponding to the feature amount of the model image; the search-range determination module for determining, by using the setting value, a range of searching the input image for a feature amount corresponding to a feature amount of the model image; and the display module, in superposition with the model image, a search range determined by the search-range determination module.

19 Claims, 23 Drawing Sheets

(51) Int. Cl.
*G06T 7/00* (2006.01)
*G06T 11/60* (2006.01)

(52) U.S. Cl.
CPC . *G06K2209/19* (2013.01); *G06T 2207/20092* (2013.01); *G06T 2207/30164* (2013.01)

(56) References Cited

U.S. PATENT DOCUMENTS

| | | | |
|---|---|---|---|
| 8,095,231 B2* | 1/2012 | Tasker | H01J 37/28 700/121 |
| 9,092,841 B2* | 7/2015 | Silver | G06T 7/0006 |
| 2005/0275831 A1 | 12/2005 | Silver | |
| 2008/0097621 A1 | 4/2008 | Tasker et al. | |
| 2015/0055823 A1* | 2/2015 | Kotake | G01N 21/956 382/103 |

OTHER PUBLICATIONS

U.S. Appl. No. 14/625,894 to Yoshihisa Minato et al., filed Feb. 19, 2015.
U.S. Appl. No. 14/601,524 to Yoshihisa Minato et al., filed Jan. 21, 2015.
U.S. Appl. No. 14/561,728 to Yoshihisa Minato et al., filed Dec. 5, 2014.
Extended European Search Report (EESR) from European Patent Office (EPO)) in European Patent Application No. 15151909.7, dated Jul. 23, 2015.

* cited by examiner

IMAGE PROCESSING DEVICE, IMAGE PROCESSING METHOD, AND IMAGE PROCESSING PROGRAM

CROSS-REFERENCE TO RELATED APPLICATION

This application is based on Japanese Patent Application No. 2014-051328 filed with the Japan Patent Office on Mar. 14, 2014 the entire contents of which are incorporated herein by reference.

FIELD

The present invention relates to an image processing device, an image processing method, and an image processing program for searching an input image for a feature amount based on a feature amount included in a model image.

BACKGROUND

In the FA (Factory Automation) field, there are executed a processing of measuring a size, a position, and the like of a detection object such as a work, by image-capturing the detection object, and a processing of searching for a position or a region that matches a pre-registered model image.

For example, Unexamined Japanese Patent Publication No. 2013-156094 discloses a technique of automatically adaptively setting a test region and making it possible to perform a test with high accuracy, even when a test object has an individual difference and even when a position and a direction of the test object are indefinite.

SUMMARY

As an application of the above type of image processing, there is the application for image-capturing a detection object, specifying a position or a region in which the detection object exists, and also giving a certain action (for example, grasping of a work and various kinds of processing to the work) to an arbitrarily-determined position or region based on a specified position or region. According to such an application, information of a feature amount of the detection object and the position or the region where the action is to be given to the detection object is pre-registered as model information.

However, there is a case where an object having a possibility of generating a shape different from a shape registered as model information becomes a detection object. For example, there are assumed a work of which a shape is determined depending on an environmental condition such as temperature and humidity in the pre-process, and a work configured by a flexible material of which a shape easily changes by receiving the influence of external force (gravity, for example).

In order to detect such a work of which a shape changes, usually, a user needs to pre-set various image processing parameters. However, among the image processing parameters, there are many image processing parameters of which meanings the user cannot intuitively understand. Therefore, the user needs to set parameters by trial and error, and requires a lot of time to set the image processing parameters. Accordingly, there has been desired a method for simply setting the image processing parameters.

According to an embodiment, an image processing device includes: a storage unit for holding a feature amount of a feature portion of a model image; a search-range reception unit for receiving a setting value indicating a size of a range of searching an input image for a feature amount corresponding to a feature amount of the model image; a search range determination unit for determining, by using the setting value, a range of searching the input image for a feature amount corresponding to a feature amount of the model image; and a display unit for displaying, in superposition with the model image, a search range determined by the search range determination unit.

Preferably, the display unit changes display of a search range determined by the search range determination unit, according to a change in the setting value.

Preferably, the display unit displays, in superposition with the input image, a search range determined by the search range determination unit.

Preferably, information held by the storage unit includes a plurality of feature portions within the model image. The image processing device further includes a correspondence-relationship determination unit for determining a feature portion on the input image corresponding to a feature portion of the model image, within a search range determined for the feature portion of the model image, for each of a plurality of feature portions of the model image. The display unit displays, in a mode comparable with the model image, an image obtained by deforming the model image according to a correspondence relationship between each of a plurality of feature portions of the model image and each of a plurality of feature portions of the input image.

Preferably, the image processing device further includes an adjusting unit for partly adjusting a range of searching the input image for a feature amount corresponding to a feature amount of the model image.

Preferably, the image processing device includes: a direction receiving unit for receiving, concerning a feature portion of the model image, a setting value indicating a size of inclination of an edge to be searched for in the input image; and a direction determination unit for determining, by using a setting value received by the direction receiving unit, a range of relative inclination of an edge to be searched for in the input image, based on inclination of an edge of a feature portion of the model image. The display unit displays, in superposition with the model image, a range of relative inclination of an edge to be searched for determined by the direction determination unit.

Preferably, the display unit changes display of a range of relative inclination of an edge to be searched for determined by the direction determination unit, according to a change in a setting value received by the direction receiving unit.

According to other embodiment, an image processing method includes: a step of holding a feature amount of a feature portion of a model image; a step of receiving a setting value indicating a size of a range of searching an input image for a feature amount corresponding to a feature amount of the model image; a step of determining, by using a setting value, a range of searching the input image for a feature amount corresponding to a feature amount of the model image; and a step of displaying, in superposition with the model image, a search range determined by the step of determining.

Further, according to other embodiment, there is provided an image processing program. The image processing program makes a computer execute: a step of holding a feature amount of a feature portion of a model image; a step of receiving a setting value indicating a size of a range of searching an input image for a feature amount corresponding to a feature amount of the model image; a step of determining, by using a setting value, a range of searching the input image for a feature amount corresponding to a feature amount of the model image; and a step of displaying, in superposition with the model image, a search range determined by the step of determining.

According to the present invention, it is possible to shorten a time required for setting a parameter to an image processing device that searches an input image by using a model image.

BRIEF DESCRIPTION OF THE DRAWINGS

FIGS. 15(A) and 15(B) are explanatory views of a method of providing, in a control point of a model image, a limit to an edge direction to be searched for;

FIGS. 16(A) and 16(B) are explanatory views of other method of providing, in a control point of a model image, a limit to an edge direction to be searched for;

DETAILED DESCRIPTION

Figure 1:
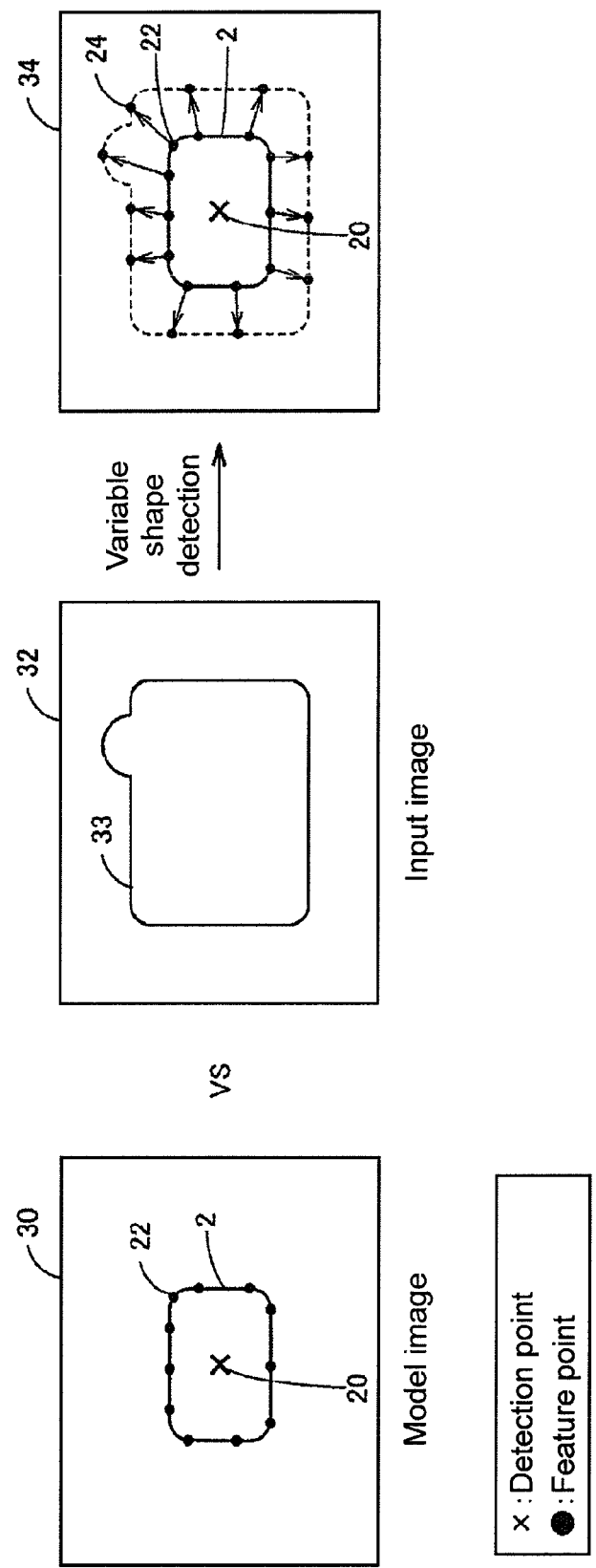
FIG. 1 is an explanatory view of a technique relevant to the present invention and a problem of the relevant technique.

Embodiments of the present invention will be described in detail with reference to the drawings. In the drawings, identical or corresponding portions will be attached with the same signs, and these portions will not be repeated.

In order to enhance the understanding of the image processing device and the image processing method according to the embodiment, a relevant technique and a problem thereof will be summarized.

FIG. 1 is an explanatory view of a technique relevant to the present invention and a problem of the relevant technique. As shown in FIG. 1, it is assumed that an image including a work 2 to be detected has been registered as a model image 30, and that a detection point 20 has been set to a detection object included in the model image 30. The detection point 20 is a point on the detection object which a robot arm of a robot 300 (refer to FIG. 2) is to be made to act or move.

At a model registration time, as shown in FIG. 1, a user assigns one or a plurality of detection points 20 (an "x" mark in the drawing) that the user wants to specify in each input image. That is, the user assigns one or a plurality of detection points of which positions that the user wants to know in the image-captured detection object.

At the model registration time, the image processing device according to the relevant technique extracts a feature amount from the model image of the work 2, determines as a control point 22 a feature portion that indicates a noticeable feature amount (an edge, in the example shown in FIG. 1), and registers the control point 22. Each of the control points 22 is stored, by relating to the control point 22, information indicating a position (that is, a coordinate value) and a corresponding feature amount. In general, a plurality of control points 22 is registered. The feature amount corresponding to the control point 22 can include one or a plurality of feature amounts near the control point 22.

As shown in FIG. 1, it is assumed that a shape of a detection object included in an input image 32 is different from a shape of the detection object included in a pre-registered model image, and is in what is called a deformed state.

The image processing technique according to the relevant technique is for searching the input image 32 for a feature point 24 corresponding to each of the control points 22 of the model image 30. Accordingly, by the image processing technique, a correspondence relationship between the control point 22 on the model image 30 and the feature point 24 on the input image 32 is determined. Then, by the image processing technique, a detection point 21 corresponding to arbitrarily set detection point 20 is estimated by interpolation, by utilizing this correspondence relationship. Therefore, even when a detection object of a different shape is flowing on a conveyor 10, the robot arm of the robot 300 can specify a shape and a position of the object, and can operate by matching the shape of the detection object.

When the input image 32 is searched unlimitedly for the feature points 24 corresponding to the control points 22 on the model image 30, it takes much search time for the corresponding control points. Further, when the input image 32 is unlimitedly searched for the feature points 24, because of increased number of candidates of corresponding feature points on the input image 32, there becomes a high possibility of determining an erroneous point on the input image 32 as a corresponding feature point. Consequently, the robot arm of the robot 300 becomes unable to correctly detect a position and a shape of the detection object. In order to solve these problems, an image processing device 100 according to the embodiment can provide a limit to the control points included in the model image, by setting a parameter to a range (hereinafter, also referred to as "search range") of searching the input image for corresponding control points.

Description has been made above by taking a feature point (the control point 22) as an example of the feature portion where a feature amount included in the model image is generated. However, the feature portion is not limited to the feature point. For example, the feature portion includes a characteristic region in the model image consisting of a set of the feature points, and a characteristic line in the model image consisting of a set of the feature points, in addition to the feature points included in the model image. Hereinafter, description will be made by taking a feature point (that is, a control point) as an example of the feature portion of the model image.

<First Embodiment>

[A. Configuration of System]

The image processing device of the embodiment can be applied to various kinds of applications. As an example, there will be described an application that the robot gives a certain action to the work 2 based on information obtained by image-capturing of the work 2. Hereinafter, for convenience of description, a processing of specifying or detecting mainly a "position" (that is, one coordinate value) will be described. However, without limiting to this, a "region" (that is, a set of a plurality of coordinate values) can be specified or detected.

Figure 2:
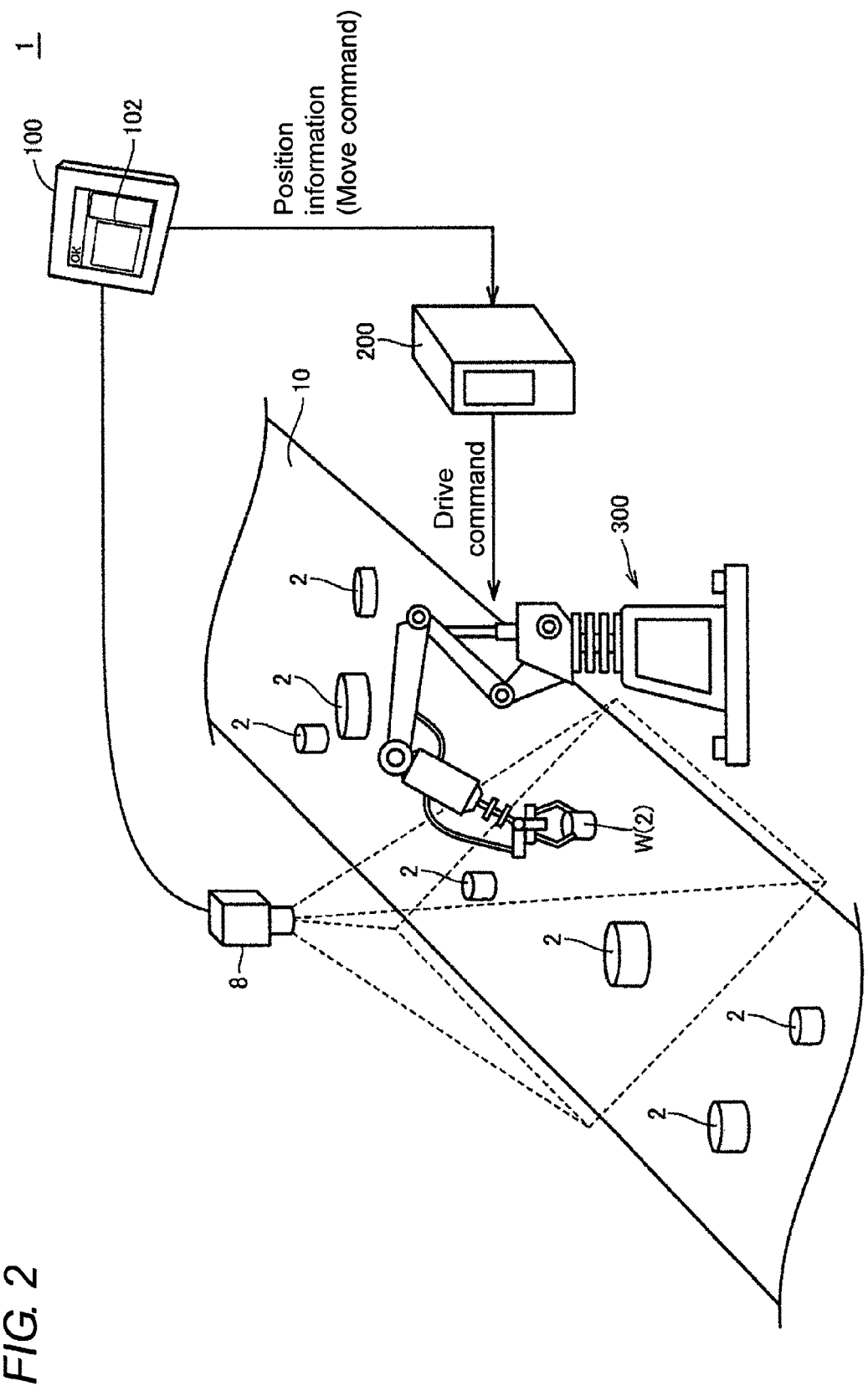
FIG. 2 is a schematic view of a configuration of a system including an image processing device according to a first embodiment.

FIG. 2 is a schematic view of a configuration of a system 1 including the image processing device 100 according to the embodiment. In FIG. 2, the system 1 mainly includes the image processing device 100, a robot controller 200, and the robot 300. The system 1 image-captures a part of a region on the conveyor 10 by using an image capturing unit 8, processes the image (hereinafter, also referred to as "input image") obtained by the image capturing, specifies a position of a detection object (hereinafter, also referred to as "work W" conveyed on the conveyor 10, grasps the work W at a predetermined position, based on information of the specified position, and moves the work W to outside of the conveyor 10.

More specifically, the image processing device 100 executes the image processing described in detail below to the input image from the image capturing unit 8. The image processing device 100 outputs to the robot controller 200, positional information (or a move command) obtained from an execution result of the image processing. The robot controller 200 drives the robot 300, by giving a drive command, following the information from the image processing device 100. Representatively, the robot 300 has a servomotor in each movable shaft, and the robot controller 200 outputs a pulse signal including pulses of the number corresponding to a moving amount calculated for each shaft.

As described later, it is assumed that a position at which the robot 300 should grasp the work W has been pre-registered. More specifically, according to the image processing device 100, in addition to shape information of the work W to be grasped, a position at which a certain action is to be given to the work W has been pre-registered. The image processing device 100 can specify the position at which the work W should be grasped, even when the work W has been changed in a shape different from a shape registered as the model information.

In addition to the system that grasps the work W as shown in FIG. 2, the invention can be also applied to a system that performs an operation or a processing to works. For example, concerning works, when a disconnection position, a punching position, a grinding position, a printing position, a coating position, and the like have been pre-registered, the image processing device 100 can also specify a position corresponding to the pre-registered position, and perform a processing to works having shapes different from the registered shapes.

[B. Summary]

Figure 3:
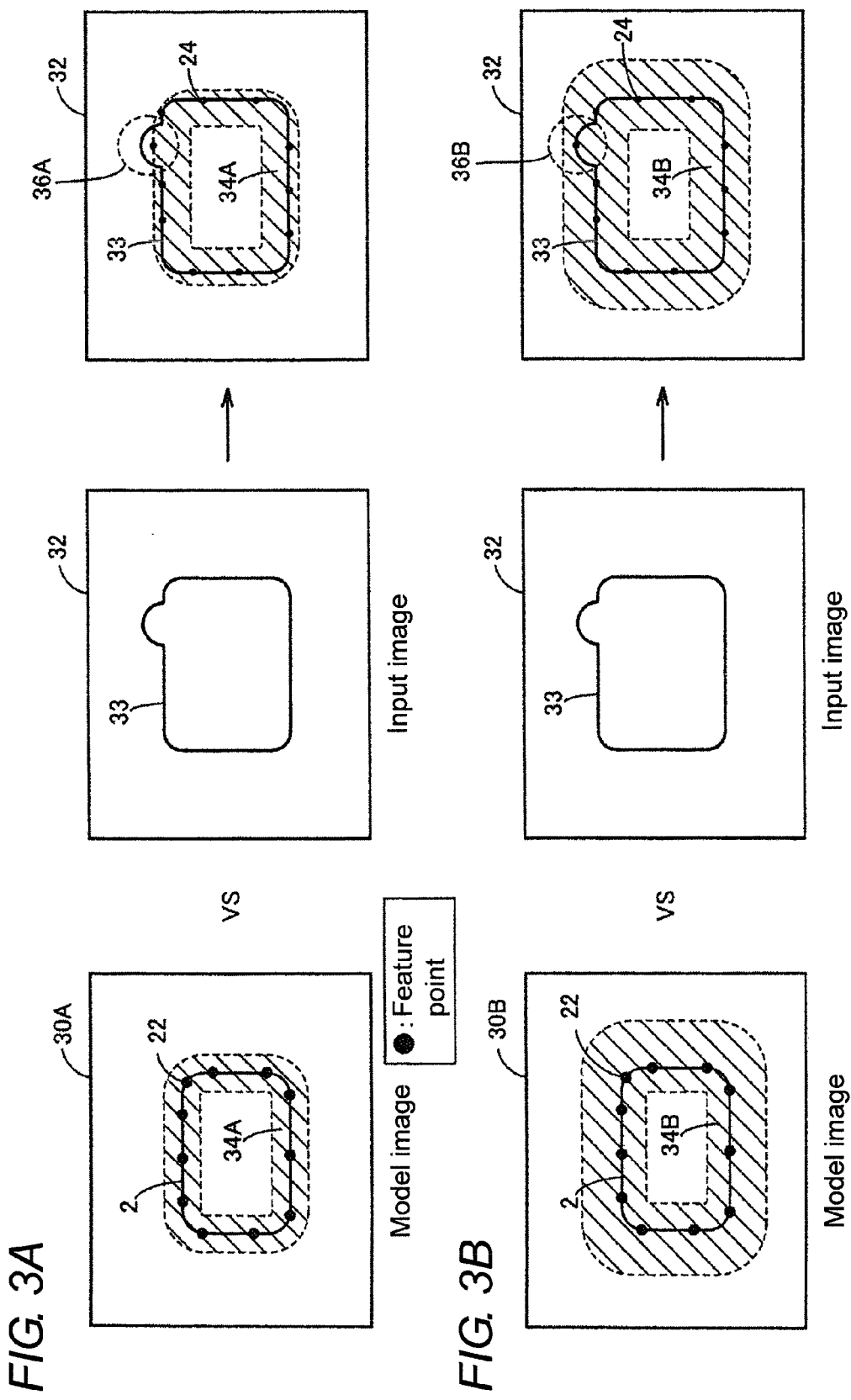
FIGS. 3(A) and 3(B) are explanatory views of a search range set in a model image.

With reference to FIGS. 3(A) and 3(B), a summary of the image processing device 100 according to the embodiment will be described. FIGS. 3(A) and 3(B) are explanatory views of a search range which is set in a model image.

When the user has set a parameter (hereinafter, also referred to as "range parameter") indicating a size of a search range, the user can provide a limit to a range (that is, a search range) of searching the input image 32 for a feature point corresponding to a control point of a model image 30A. As an example, FIG. 3(A) shows a state that a search range 34A of the control points 22 included in the model image 30A has been set. By setting the search range, the user can set to what degree deformation of the work 2 is to be permitted. That is, the image processing device 100 changes a degree of deformation that is permitted to the registered work, according to the set search range.

Further, as shown in FIG. 3(A), at the search range setting time, the image processing device 100 displays the search range 34A in superposition with the model image 30A. That is, the user can set the range parameter while confirming the search range displayed in superposition with the model image. Accordingly, the user can intuitively understand to what degree deformation of the registered work 2 is to be permitted.

When the image processing device 100 has obtained the input image 32, the image processing device 100 searches the input image 32 for a feature point corresponding to each of the control points 22, within the set range of the search range 34A. A search result is shown on the input image 32. At this time, when the search range has not been set correctly, as shown in an image region 36A of the input image 32, a corresponding feature point is detected erroneously in some cases.

In such a case, the user can set the search range again according to the need, and set a correct search range. When the user has re-set the range parameter, the image processing device 100 changes the size of the display of the search range according to the set range parameter, as shown in a model image 30B in FIG. 3(B). Accordingly, as shown in an image region 36B of the input image 32, the image processing device 100 can correctly detect the corresponding feature point.

In this way, because the image processing device 100 changes the display size of the search range by matching the range parameter, the user can intuitively understand to what degree of influence the range parameter gives to a variable shape detection processing.

[C. Hardware Configuration of the Image Processing Device 100]

Figure 4:
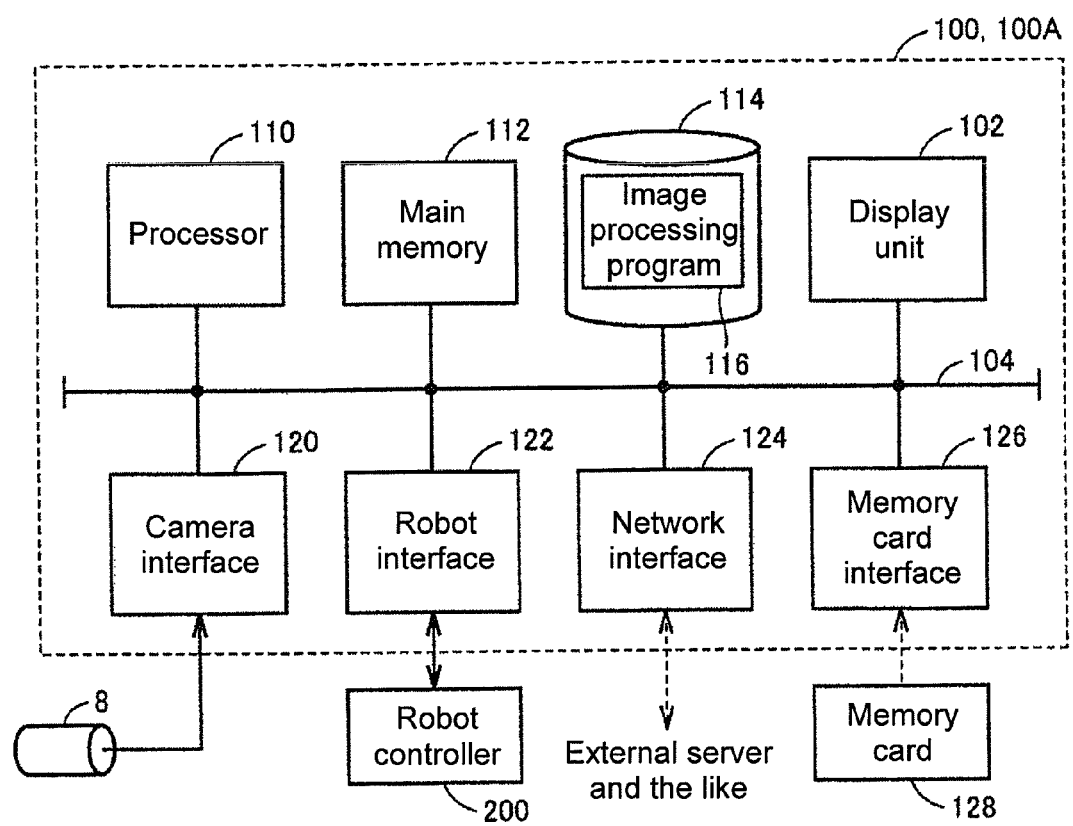
FIG. 4 is a schematic view of a hardware configuration of the image processing device according to the first embodiment.

FIG. 4 is a schematic view of a hardware configuration of the image processing device 100 according to the embodiment. In FIG. 4, the image processing device 100 has representatively a structure following a general-purpose computer architecture. The processor realizes various kinds of image processings described later, by executing a program installed in advance.

More specifically, the image processing device 100 includes a display unit 102, a processor 110 such as a CPU (Central Processing Unit) and an MPU (Micro-Processing Unit), a main memory 112, a hard disk 114, a camera interface 120, a robot interface 122, a network interface 124, and a memory card interface 126. These parts are connected to each other so as to be able to perform data communications via an internal bus 104.

The processor 110 executes the image processing of the embodiment, by reading an image processing program 116 stored in the hard disk 114, and executing the image processing program 116 by developing in the main memory 112. The display unit 102 displays various kinds of information accompanied with the execution of the image processing. A part or a whole of the execution result of the image processing may be output to the robot controller 200 through the robot interface 122.

The image processing program 116 is distributed in the state of being stored in a memory card 106, for example. In this case, the image processing program 116 stored in the memory card 106 is read through the memory card interface 126, and is then installed in the hard disk 114. Alternatively, the image processing program 116 may be configured to be distributed from the external server through the network interface 124.

In the case of using the image processing device 100 having a structure following a general-purpose computer architecture, there may have been installed an OS (Operating System) for providing a basic function of the computer. In this case, the image processing program 116 may be the one for executing a processing by calling a necessary module in a predetermined order and/or in a predetermined timing, out of program modules provided as a part of the OS. That is, the image processing program 116 may not include all modules necessary for the image processing of the embodiment, and may be in the mode of providing a part of the necessary modules from the OS. Further, the image processing program 116 of the embodiment may be provided by being built in a part of other program.

The camera interface 120 receives the input image obtained by image-capturing by the image capturing unit 8. The image capturing unit 8 is representatively configured by including image capturing elements such as a CCD (Coupled Charged Device) and a CMOS (Complementary Metal Oxide Semiconductor) sensor, in addition to an optical system such as a lens. FIG. 2 shows a configuration example that the image capturing unit 8 is provided separately from the image processing device 100, and an input image that becomes the object of the image processing is provided from the image capturing unit 8. However, the configuration is not limited to this example. For example, the image processing device 100 and the image capturing unit 8 may be integrally configured, and the image processing may be directly executed to the input image generated by the image capturing. Alternatively, the input image that becomes the object of the image processing may be given to the image processing device 100 via various kinds of memory mediums or communication mediums.

Alternatively, a part or a whole of the functions provided by executing the image processing program 116 may be installed as a dedicated hardware circuit.

[D. Functional Configuration of the Image Processing Device 100]

Figure 5:
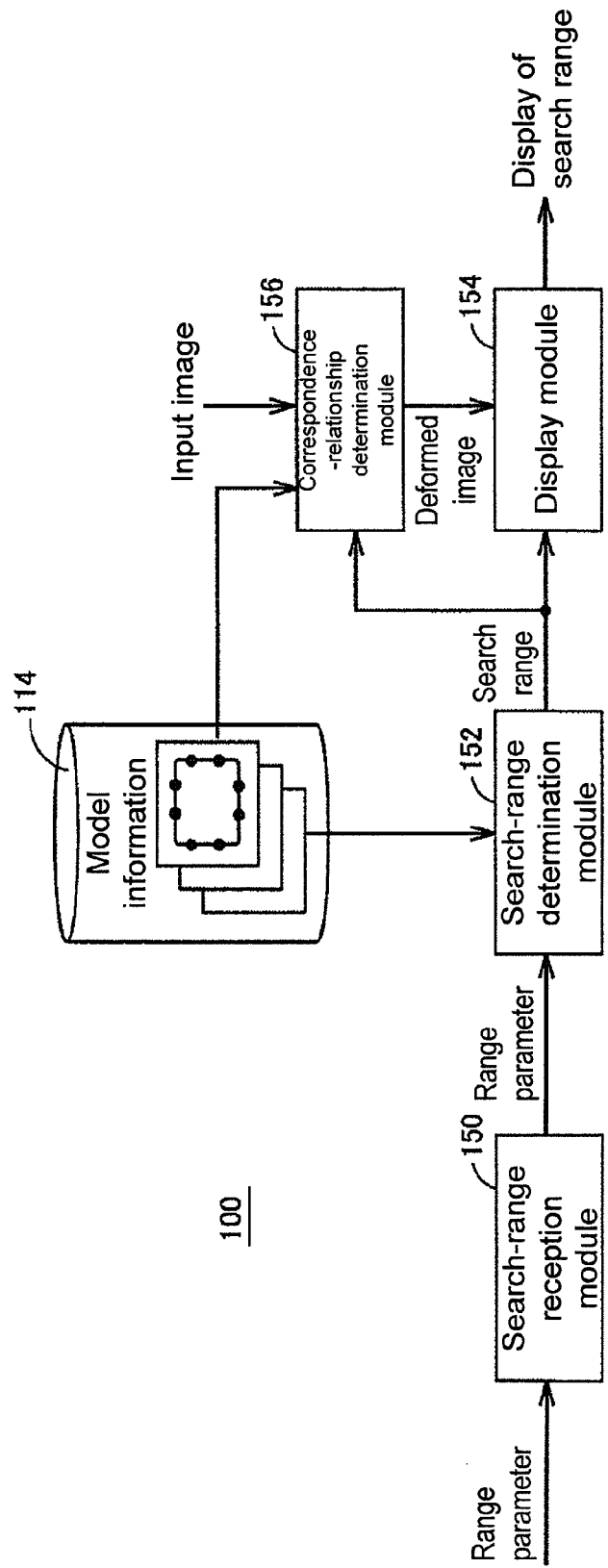
FIG. 5 is a schematic view of a functional configuration of the image processing device according to the first embodiment.

FIG. 5 is a schematic view of a functional configuration of the image processing device 100 according to the embodiment. Each module shown in FIG. 5 is representatively realized by the processor 110 executing the image processing program 116 (both shown in FIG. 5).

In FIG. 5, the image processing device 100 includes, as a functional configuration thereof, a search-range reception module 150, a search-range determination module 152, a display module 154, and a correspondence-relationship determination module 156. However, the correspondence-relationship determination module 156 is optional, and is provided according to the need.

The search-range reception module 150 receives a setting value (that is, a range parameter) indicating a size of the range of searching the input image for a feature amount corresponding to a feature amount of the model image. A detailed method of setting a range parameter will be described later. The search-range reception module 150 outputs a received range parameter to the search-range determination module 152.

The search-range determination module 152 determines a range (that is, a search range) of searching the input image for a feature amount corresponding to a feature amount of the model image, by using a range parameter set by the user. Representatively, the control point of the model image is the point on an edge of the model image. Edge extraction is realized by obtaining a gradient of a pixel value by differentiating the model image, for example. Representatively, the search-range determination module 152 performs the edge extraction by folding in the model image, a differential filter, a Prewitt filter, a Sobel filter, a Laplacian filter, an LOF filter, and other filter capable of extracting an edge. The search-range determination module 152 sets a part or a whole of extracted edge portions as control points. A detailed method of determining a search range by the search-range determination module 152 will be described later.

The display module 154 displays, in superposition with the model image, a search range determined by the search-range determination module 152. Representatively, a search range displayed in superposition with the model image is displayed linked to the range parameter that the user sets. A detailed method of displaying a search range by the display module 154 will be described later.

The correspondence-relationship determination module 156 determines a correspondence relationship between each feature point of the model image and each feature point of the input image, based on a search range set to each feature point of the model image. More specifically, the correspondence-relationship determination module 156 determines a feature portion on the input image corresponding to a feature point of the model image, for each feature point of the model image, in a determined search range of the feature point. The correspondence-relationship determination module 156 deforms the model image based on the determined correspondence relationship, and generates a deformed image. A detailed method of generating a deformed image will be described later. The correspondence-relationship determination module 156 outputs a generated deformed image to the display module 154.

[E. Setting Screen of Search Range]

Figure 6:
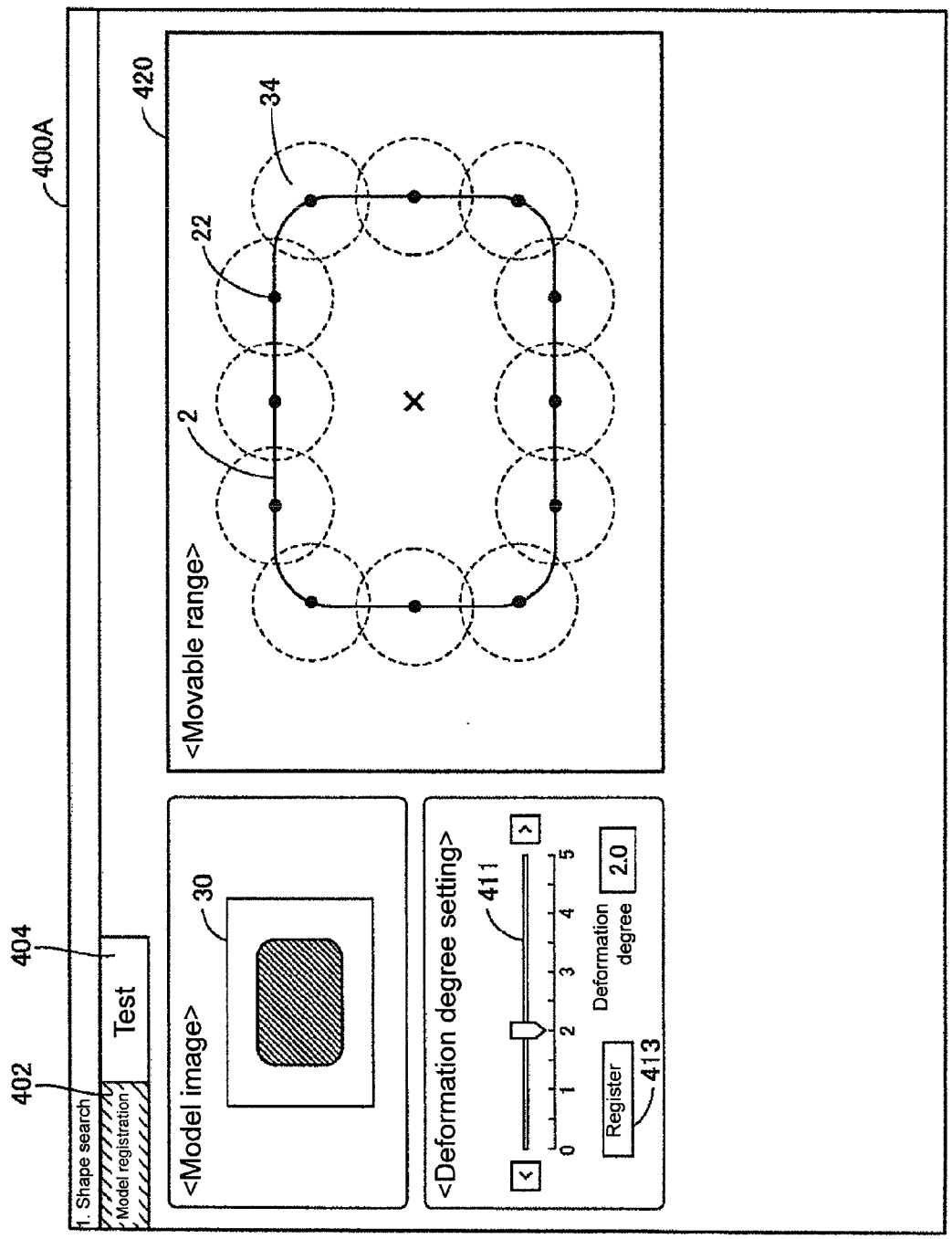
FIG. 6 is an explanatory view of an example of a display mode of a search range.
Figure 7:
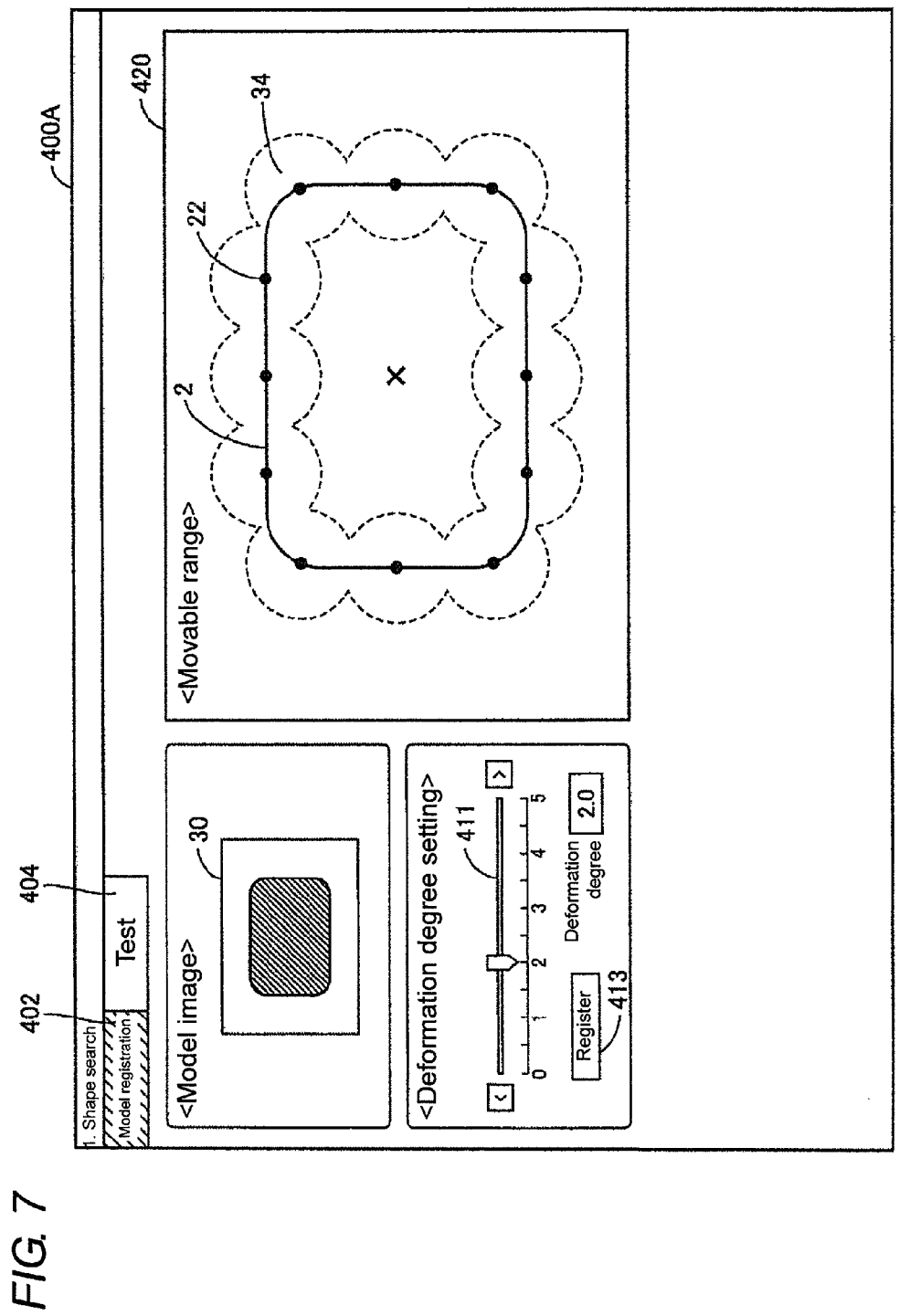
FIG. 7 is an explanatory view of other example of a display mode of a search range.
Figure 8A:
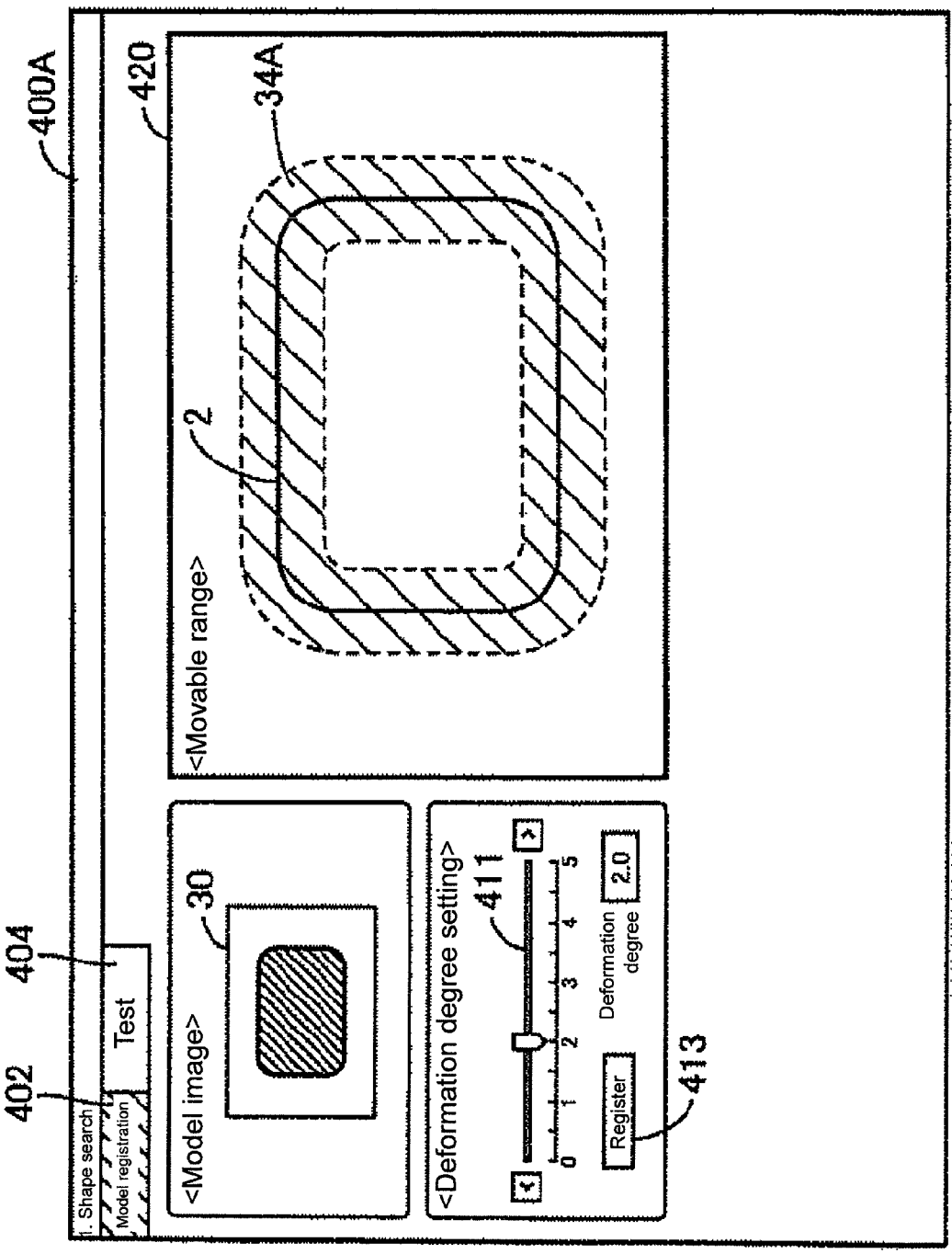
FIGS. 8(A) and 8(B) show a state that a search range is displayed linked to a range parameter.
Figure 8B:
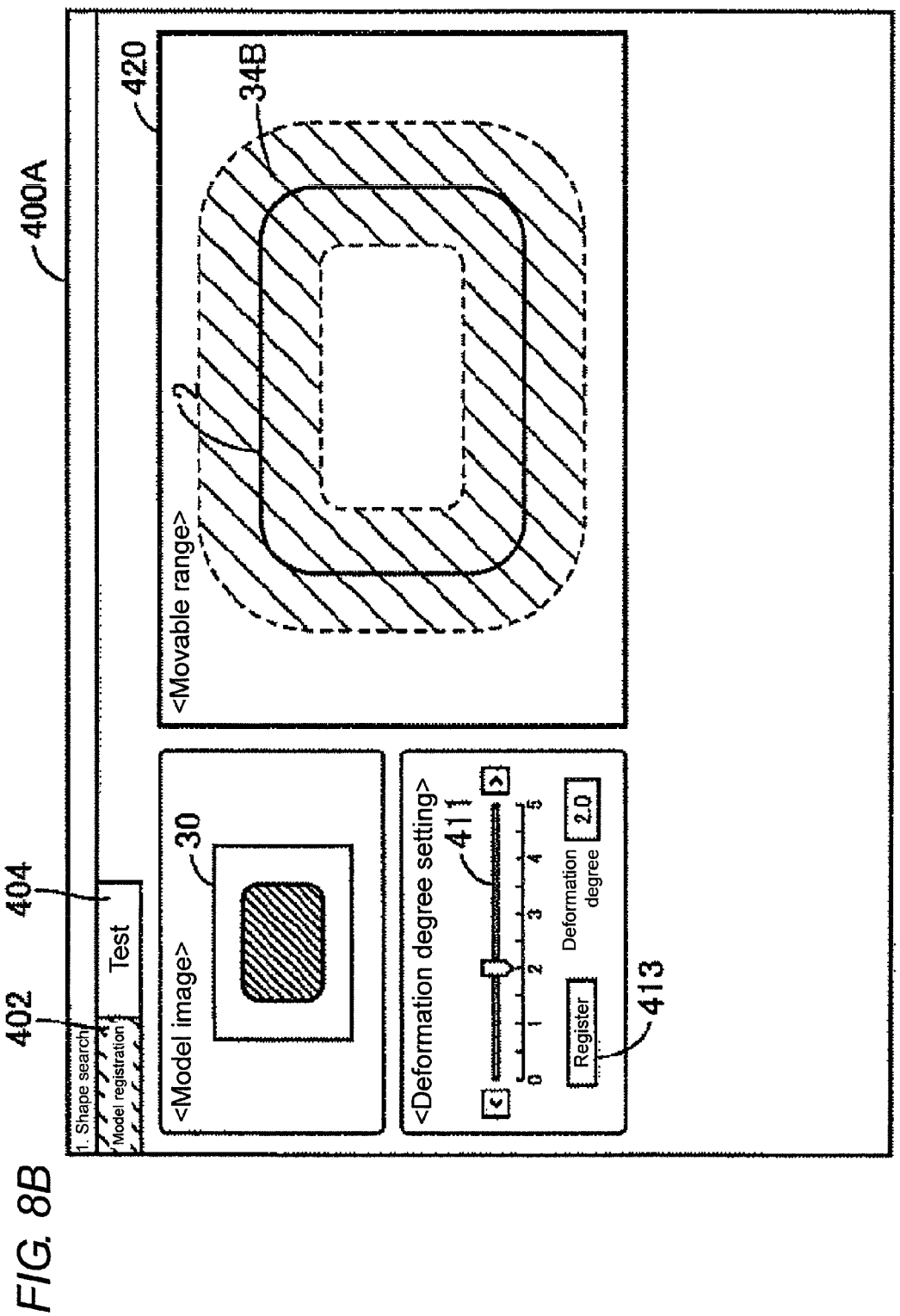
Figure 9:
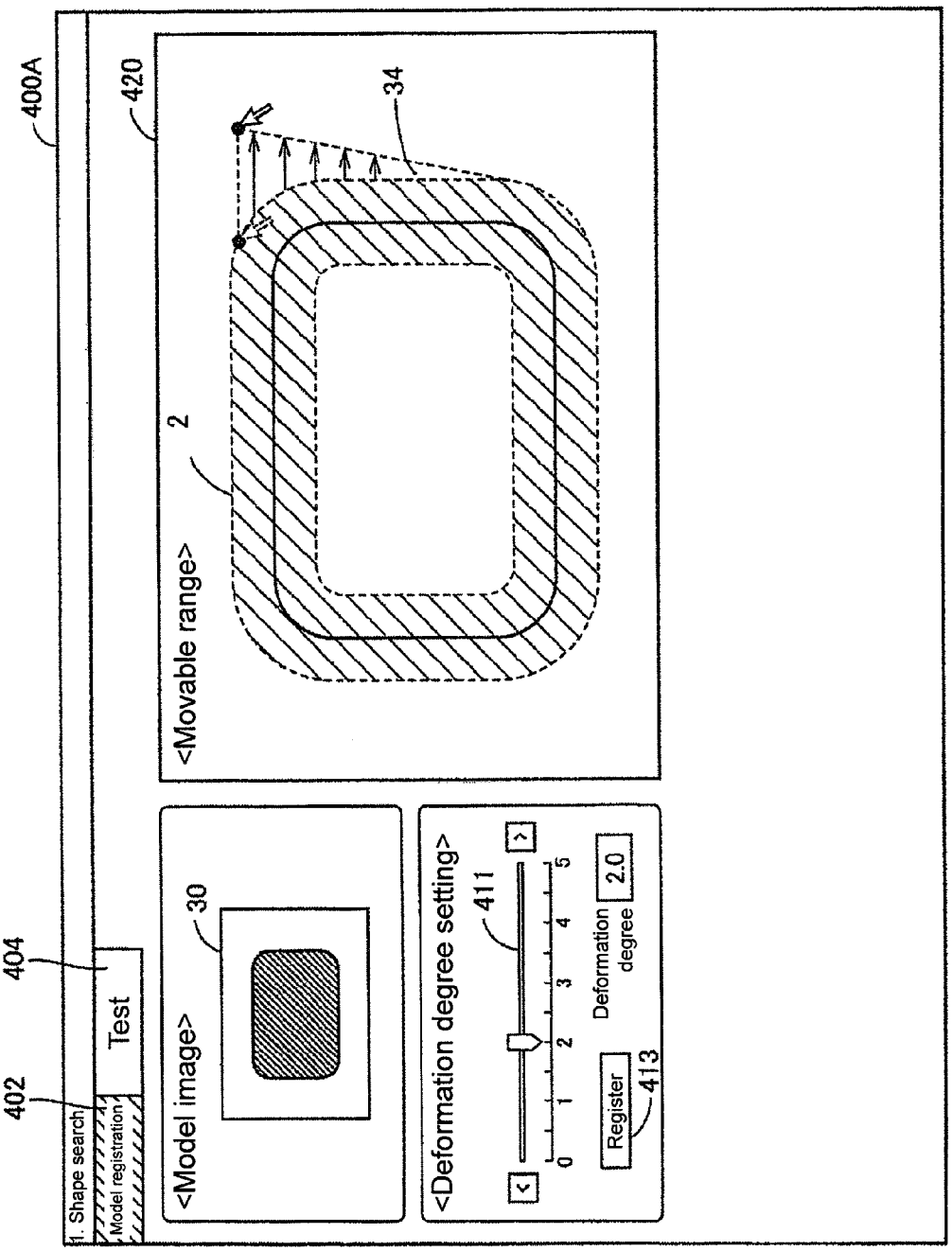
FIG. 9 shows a state that the user is partly adjusting a search range.

With reference to FIG. 6 to FIG. 9, a method of setting a search range will be described. FIG. 6 to FIG. 9 show a setting screen 400A for setting a search range. FIG. 6 is an explanatory view of an example of a display mode of a search range. FIG. 7 is an explanatory view of other example of a display mode of a search range. FIGS. 8(A) and 8(B) show a state that a search range is displayed linked to a range parameter. FIG. 9 shows a state that the user is partly adjusting a search range.

The image processing device 100 displays, in superposition with the model image, a search range that has been set to the model image, so that the user can confirm the search range. When the user can visually confirm the search range, the user can confirm at a glance to what degree deformation is to be permitted to the work included in the model image.

With reference to FIG. 6, there will be described a processing procedure for displaying a search range 34 of the model image 30. When the user has selected a model registration tag 402 (a shaded portion in FIG. 6), the user can register or adjust the search range 34 of the model image 30.

Upon receiving the model image 30, the search-range determination module 152 determines the control points 22 within the model image 30, and also sets the search range 34 of each control point 22 according to a value of the range parameter that is being set at present. The display module 154 displays the determined search ranges 34, in superposition with the model image 30. For a display mode of the search ranges 34, each point of the control points is displayed in a circular shape, as shown in the display region 420 of the setting screen 400A.

When a large number of control points have been detected, superposition of the search ranges 34 makes it difficult to look at the search ranges 34. Therefore, as shown in FIG. 7, the display module 154 does not need to display superposed portions of search ranges 34. That is, the display module 154 displays only the outer shape of a sum of sets of the search ranges 34, for the superposed search ranges 34. The display module 154 displays only an outermost outline of all search ranges.

Further, the user can set a range parameter by operating a slide bar 411 as the search-range reception module 150. The search-range determination module 152 determines a size of the search range of the control point 22 of the model image 30, according to the set range parameter. For example, according to the set range parameter, a radius or a diameter of the search range 34 is determined. Representatively, the search-range determination module 152 determines the size of the search range 34 to become larger when the value of the received range parameter is larger. Further, the search-range determination module 152 determines the size of the search range 34 to become smaller when the value of the received range parameter is smaller.

As an example, when the user has set a value of the range parameter to become larger as shown in FIG. 8(B) by operating the slide bar 411 shown in FIG. 8(A) with a mouse or the like, a size of the search range 34A shown in FIG. 8(A) is displayed to become larger like the search range 34B shown in FIG. 8(B). In this way, by displaying the search range linked to the set range parameter value, the user can easily understand the relationship between the range parameter and the permissible degree of deformation. Accordingly, operability of the image processing device 100 can be enhanced, and further, a setting time of the range parameter can be substantially shortened.

After setting the range parameter, when the user has selected a registration button 413 by mouse operation and the like, the image processing device 100 stores the model image and the search range by relating to each other, in the recording medium such as the hard disk 114. The image processing device 100 may store the search range for each control point by relating to each other, or may store a sum of sets of the search ranges of control points. The search range is registered as a set of coordinate values on the model image, for example.

The display module 154 is not necessarily required to link the display of the search range with the slide bar 411, and may change the display of the search range according to a change in the range parameter. For example, the display module 154 may change the display of the search range at the timing the user selects a display button (not shown).

Further, the image processing device 100 may be configured to be able to partly adjust the range of searching the input image for the feature amount corresponding to the feature amount of the model image. More specifically, as shown in FIG. 9, the user selects a part of the search range displayed in the display region 420 of the setting screen 400A, and adjusts the search range by moving the selected portion. A method of adjusting the search range is not limited to the method shown in FIG. 9, and may be any method capable of partly adjusting the search range. For example, the image processing device 100 may be configured to be able to assign, in the displayed search range, a portion to be excluded from the range of searching the input image for a corresponding feature point.

[F. Test Screen of Search Range]

Figure 10:
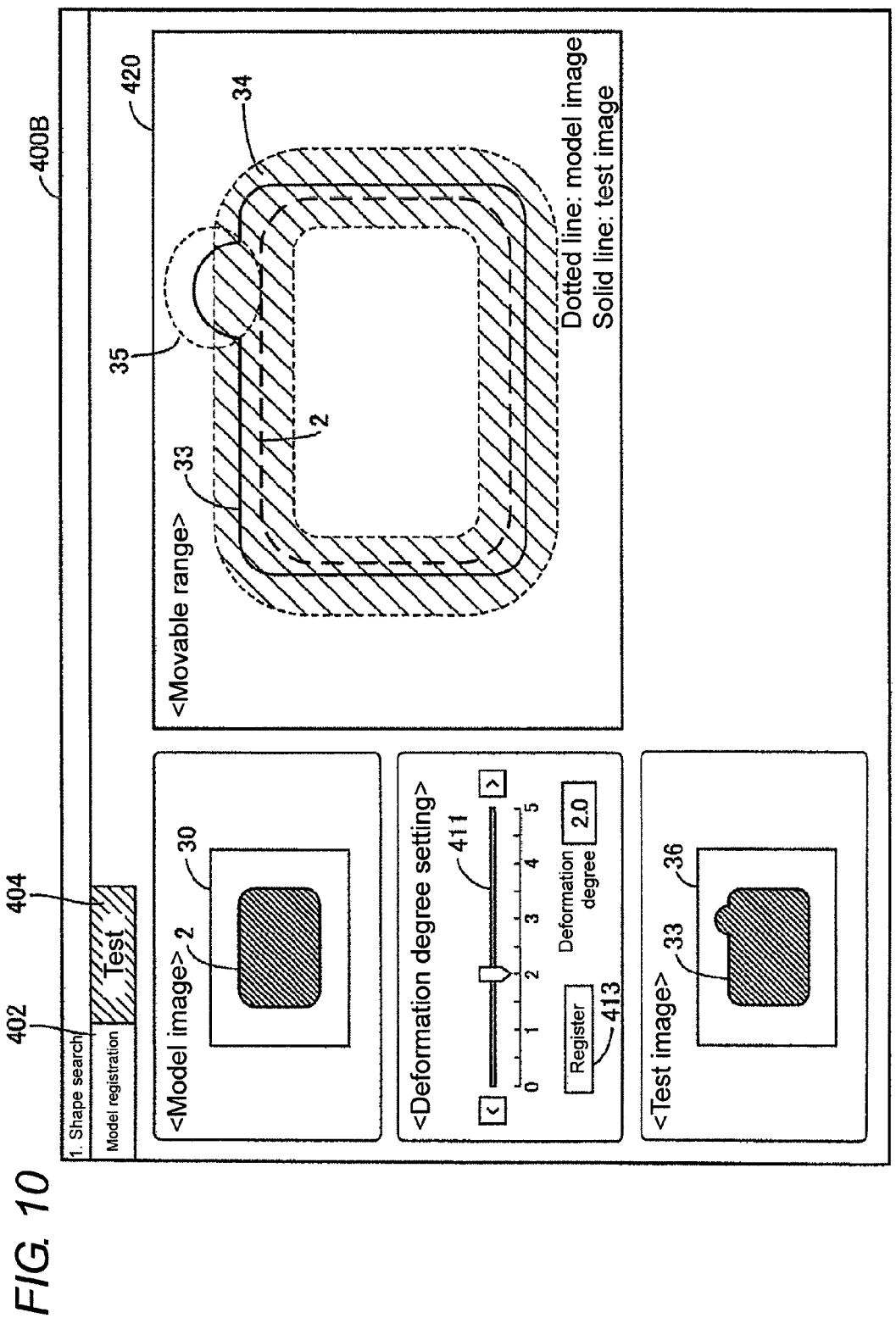
FIG. 10 shows a state that a search range is displayed in superposition with a test image.
Figure 11:
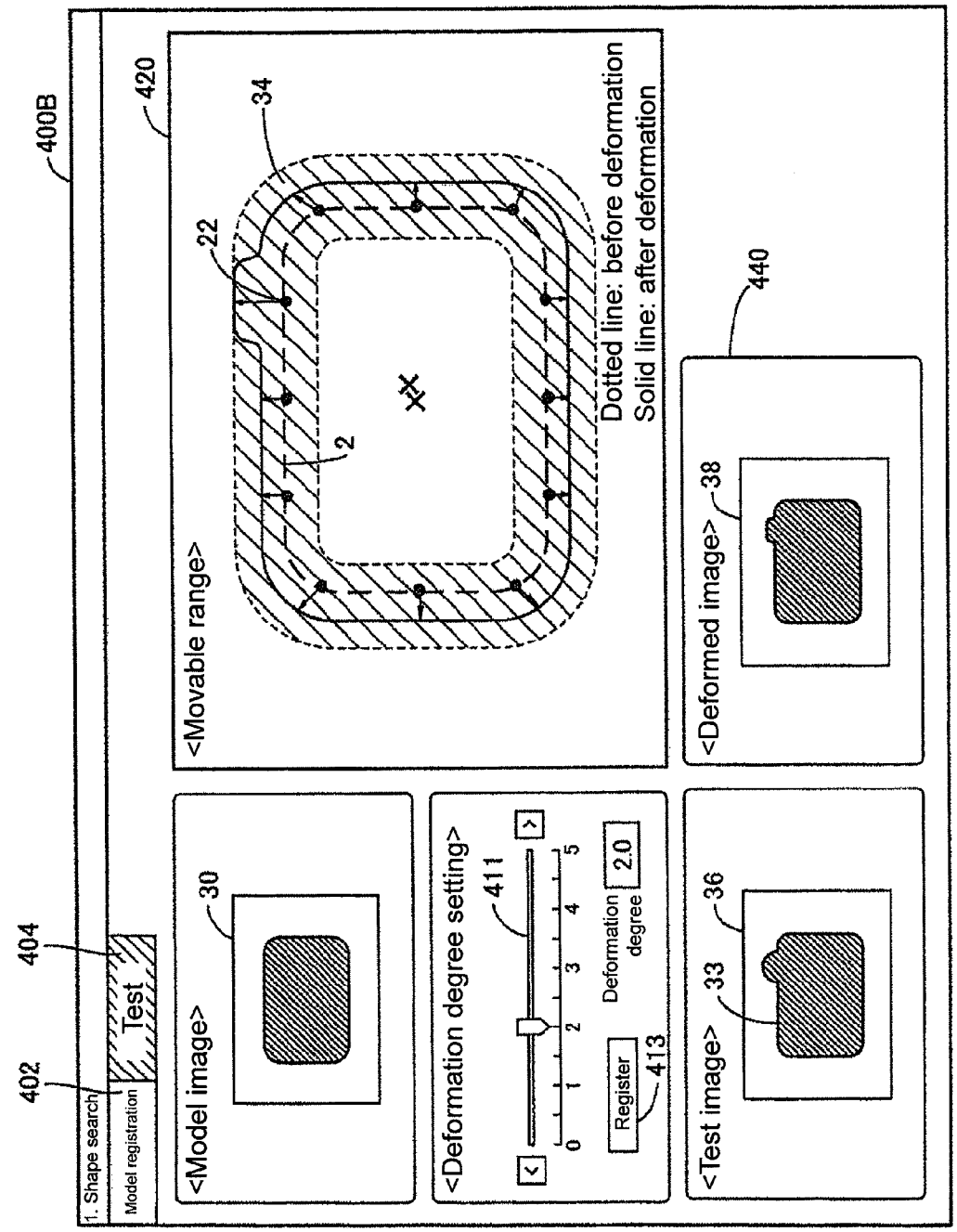
FIG. 11 shows a state that an image obtained by performing a deformation processing to a model image is displayed.

With reference to FIG. 10 and FIG. 11, there will be described a test method for confirming whether a search range has been set correctly. FIG. 10 and FIG. 11 show a test screen 400B for testing a set search range. FIG. 10 shows a state that a search range is displayed in superposition with a test image. FIG. 11 shows a state that an image obtained by performing a deformation processing to a model image is displayed.

(Display Example 1 of Test Screen)

In order to test whether a search range that the user has set in the model image has been set correctly, the image processing device 100 displays the search range in superposition with a test image that includes the work to be tested. When a tested object included in the test image is included in the set search range, the user can decide that the search range has been set correctly.

On the other hand, when a tested object included in the test image is not included in the set search range, the user can decide that the search range has not been set correctly. In this way, by displaying the search range in superposition with the test image, the user can easily confirm adequateness of the setting of a search range.

As an example, FIG. 10 shows a state that the search range 34 set in the model image 30 is displayed in superposition with a test image 36. In the example shown in FIG. 10, because a part (a dotted line 35) of the work 33 to be tested is not included in the search range 34, the image processing device 100 cannot correctly deform the work 2 included in the model image by matching the work 33 to be tested. Having confirmed this problem, the user adjusts the slide bar 411 so that the portion of the dotted line 35 is included in the search range 34. In this way, by displaying, in superposition with the search range, the tested object that the user wants to detect, the user can easily adjust the parameter of the search range.

There are considered many methods for superposing the search range 34 with the test image 36. For example, the image processing device 100 may be configured to be able to move, by the user operation, the display of either the displayed test image 36 or the search range 34. For example, the user can confirm whether the work 2 is included in the search range 34, by moving the display of either one of the test image 36 or the search range 34. Further, the image processing device 100 may extract the edge of the test image 36, and automatically position so that the extracted edge is included in the search range 34.

(Display Example 2 of Test Screen)

When an image including many edges has been input, because of increased number of candidates of feature points of the input image included in the search range, a possibility of erroneously detecting a feature point corresponding to the control point becomes high. That is, when a search range has been set too wide, there is also a possibility that the model image is not deformed as the user intends. Therefore, in order to make it possible to confirm whether the model image has been deformed as the user has intended, the image processing device 100 displays the image (hereinafter, also referred to as "deformed image") obtained by deforming the model image to the set search range, so that the deformed image can be compared with at least one of the model image and the test image. Accordingly, the user can easily confirm whether the search range has been set correctly.

As an example, in FIG. 11, a deformed image 38 obtained by deforming the model image 30 based on the set search range 34 is displayed. In this way, by displaying the deformed image 38 next to the model image 30 or the test image 36, the user can compare the model image 30 or the test image 36 with the deformed image 38. Therefore, the user can intuitively understand whether the search range has been set correctly. Further, as shown in FIG. 11, the shape of the deformed work may be displayed in superposition with the model image 30. Accordingly, the user can intuitively understand to what degree the shape of the registered work has been relatively changed.

[G. Method of Generating Deformed Image]

There are considered various methods for generating a deformed image by deforming the model image. One of the examples will be described below.

The correspondence-relationship determination module 156 determines a correspondence relationship between a detection object pre-registered as a model and a detection object included as a photographic subject in the input image, and deforms the model image 30 by utilizing the correspondence relationship. More specifically, the correspondence-relationship determination module 156 extracts a feature amount from the model image 30, and determines a feature point indicating a noticeable feature amount (for example, an edge) as the control point 22 and registers the control point 22. Concerning each of the control points 22, information indicating a position (that is, a coordinate value) and a corresponding feature amount (one or a plurality of feature amounts near the control point) are stored by relating to each other. In general, a plurality of control points 22 is registered.

In this way, the correspondence-relationship determination module 156 extracts a plurality of feature points from the model image 30 including the detection object as a photographic subject. Then, the correspondence-relationship determination module 156 holds model information including the information indicating the control points 22 as a plurality of feature points of the detection object. The control point 22 may be assigned by using a coordinate value of the feature point, or may be assigned by using a relative position from a certain feature point.

Next, when the test image 36 has been obtained as the input image by image-capturing by the image capturing unit 8, the correspondence-relationship determination module 156 determines a feature point on the test image 36 corresponding to the feature point of the model image 30, for each feature point of the model image 30, within a determined search range of the feature point. That is, the correspondence-relationship determination module 156 extracts a plurality of feature points included in the test image 36, and also determines a correspondence relationship between the extracted plurality of feature points and a plurality of feature points of the model information.

Finally, the correspondence-relationship determination module 156 calculates an interpolation function between the model image and the input image, based on the determined correspondence relationship, and deforms the model image 30, based on the calculated interpolation function. That is, the image processing device 100 relates, as one to one, each feature point of the model information and each feature point extracted from the test image 36, and determines the interpolation function expressing a correspondence relationship between a set consisting of a plurality of feature points of the model information and a set consisting of a plurality of feature points extracted from the test image 36.

For example, the correspondence-relationship determination module 156 determines an interpolation function F(x, y) that defines a relationship between an arbitrary coordinate value (x, y) on the model image and an arbitrary coordinate value (x', y') on the test image 36. As a method of determining such an interpolation function, a thin-plate spline interpolation and the like can be used. Accordingly, the correspondence-relationship determination module 156 generates a deformed image, by calculating a corresponding point (x', y') for each pixel (x, y) of the model image, by using the interpolation function F(x, y). As other methods of deforming the model image, there are affine transformation and projective transformation.

[H. Processing Procedure of the Image Processing Device 100]

Figure 12:
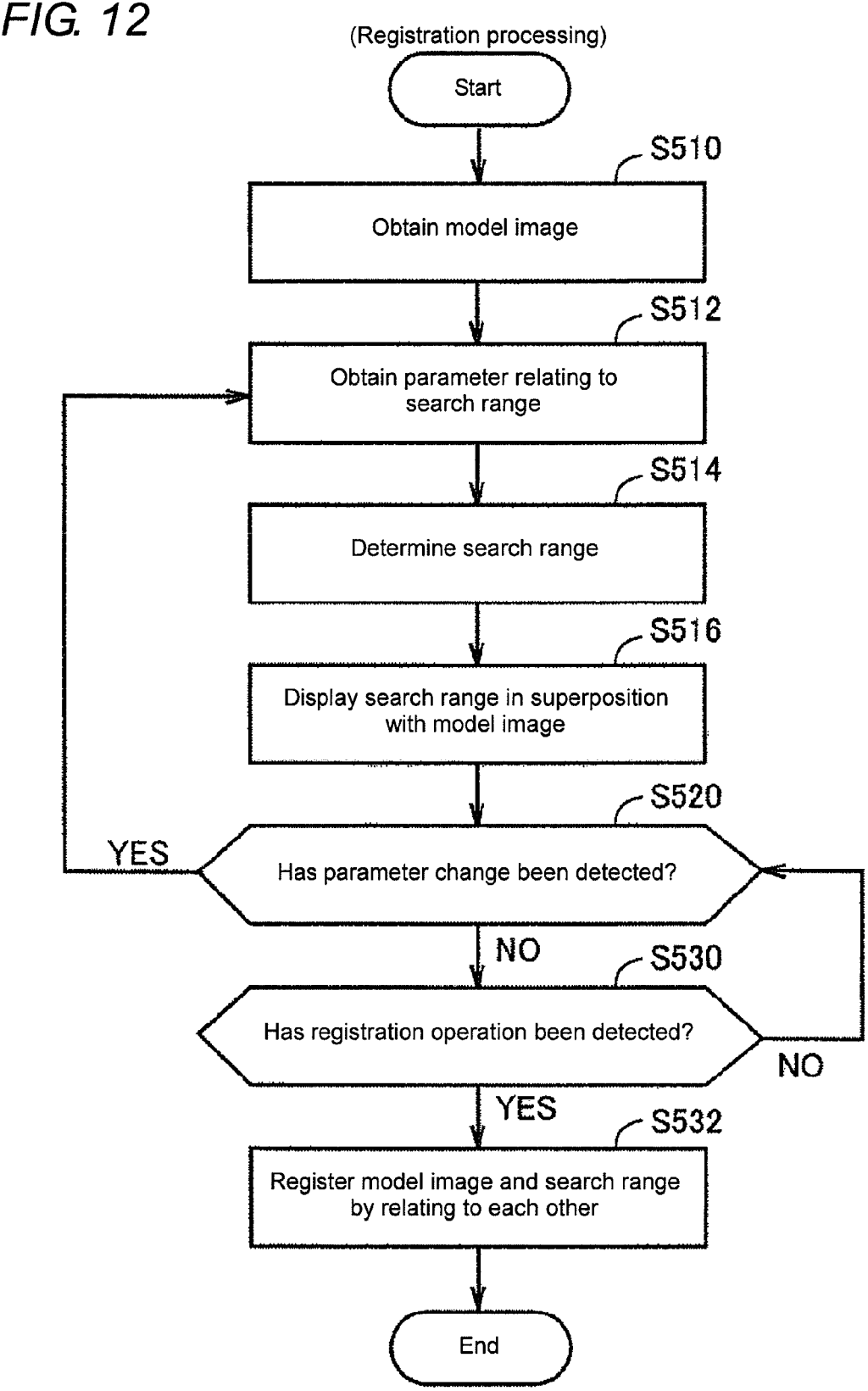
FIG. 12 shows a flowchart of a search range of a model image.
Figure 13:
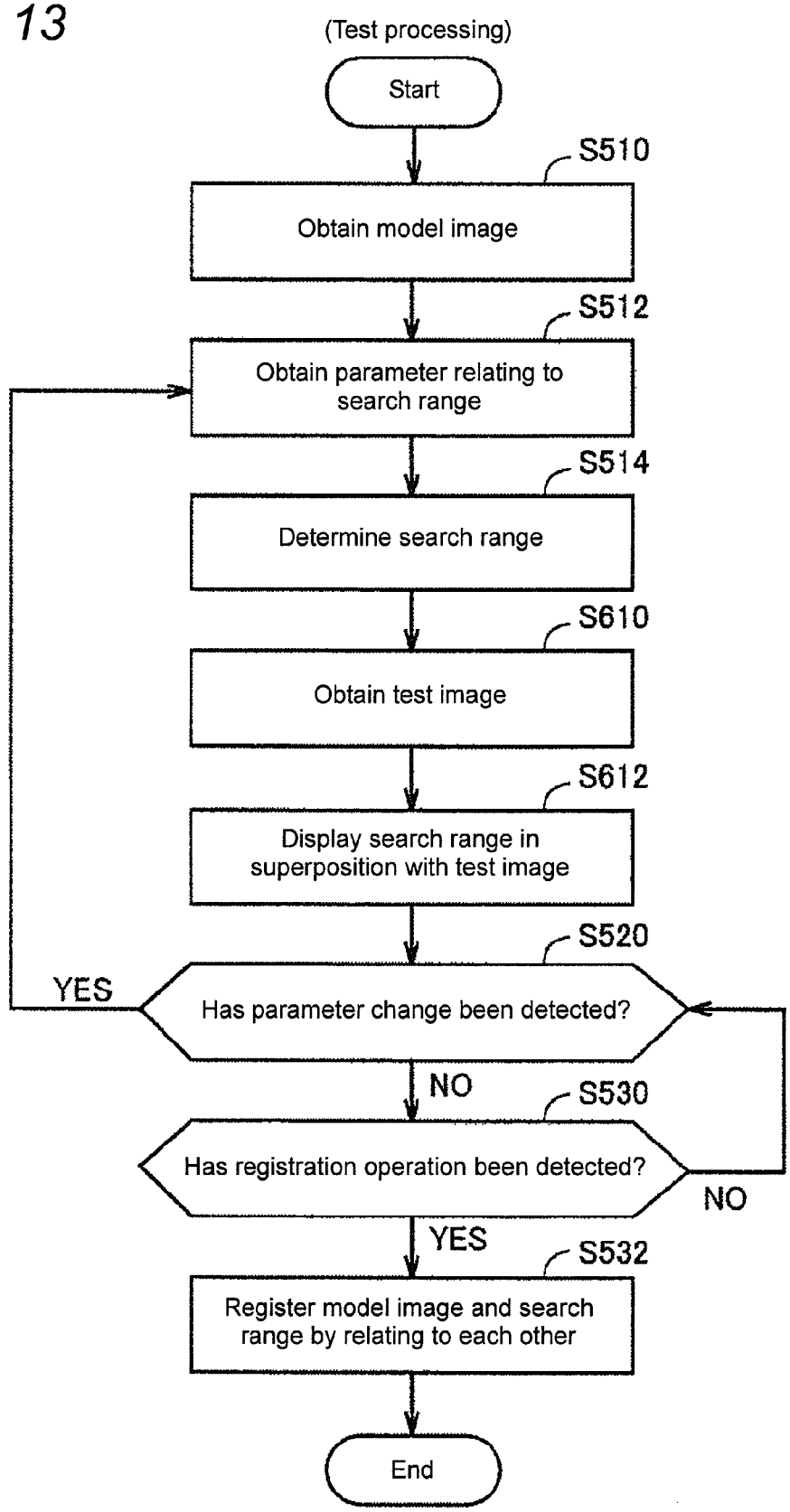
FIG. 13 shows a flowchart of a test processing for confirming adequateness of a set search range.

With reference to FIG. 12 and FIG. 13, a control structure of the image processing device 100 will be described. Representatively, the processor 110 realizes the steps shown in FIG. 12 and FIG. 13 by executing the image processing program 116 (shown in FIG. 4). In other aspect, a part or a whole of the processing may be executed by a circuit element or other hardware.

[H1. Setting Processing Flow]

First, with reference to FIG. 12, a processing procedure for setting a search range to the model image will be described. FIG. 12 shows a flowchart of a search range of a model image.

In Step S510, the processor 110 obtains a model image including a work to be registered as a photographic subject. Representatively, the model image is obtained from the image capturing unit 8. The processor 110 may obtain the model image from various kinds of recording mediums that store images obtained by image-capturing by other device. In Step S512, the processor 110, as the search-range reception module 150, receives a parameter (a setting value) indicating a size of a search range set by the user.

In Step S514, the processor 110, as the search-range determination module 152, determines a range of searching the input image for a feature point corresponding to a feature point of the model image, for each of a plurality of feature points included in the model image. Representatively, the processor 110 sets the search range larger when the value of the set range parameter is larger, and sets the search range smaller when the value of the range parameter is smaller.

In Step S516, the processor 110, as the display module 154, displays the search range in superposition with the model image. At this time, the processor 110 may display a search range of a part of a plurality of feature points included in the model image, or may display a search range of a whole of the feature points.

In Step S520, the processor 110 decides whether the user has changed the range parameter. When the processor 110 has detected a change in the range parameter (YES in Step S520), the processor 110 returns the control to Step S512. When the processor 110 has not detected a change in the range parameter (NO in Step S520), the processor 110 switches the control to Step S530.

In Step S530, the processor 110 decides whether processor 110 has detected a user operation of registering the model image. Representatively, when the user has selected, by mouse operation or the like, the registration button 413 of the setting screen 400A (refer to FIG. 6) or the registration button 413 of the test screen 400B (refer to FIG. 10), the processor 110 decides that the processor 110 has detected the registration operation of the model image. When the processor 110 has detected a user operation of registering the model image (YES in Step S530), the processor 110 switches the control to Step S532. When the processor 110 has not detected a user operation of registering the model image (NO in Step S530), the processor 110 returns the control to Step S520. In Step S532, the processor 110 stores the model image and the search range by relating to each other, in the recording medium such as the hard disk 114.

[H2. Test Processing Flow]

Next, with reference to FIG. 13, there will be described a procedure of the test processing for testing whether a search range has been set correctly. FIG. 13 shows a flowchart of a test processing for confirming adequateness of a set search range. Because the processing other than that in Step S610 and Step S612 shown in FIG. 13 is the same as the processing in each step shown in FIG. 12, repeated description will be avoided.

In Step S610, the processor 110 obtains, as the input image, a test image obtained by image-capturing the work to be tested. Representatively, the test image is obtained from the image capturing unit 8. The processor 110 may obtain the test image from various kinds of recording mediums that store images obtained by image-capturing by other device.

In Step S612, the processor 110, as the display module 154, displays the search range in superposition with the test image. When the work of the test object is included in the displayed search range, the user can decide that the search range has been set correctly. When the work of the test object is not included in the search range, the user can judge that the search range has not been set correctly.

In the above, the input image including the work to be tested has been used as the test image. However, the image including the work to be detected that is not desired to be tested may be used as the test image. In this case, the processor 110, as the display module 154, displays, in superposition with the model image, the test image including the work that is not desired to be detected. In this case, when the work that is not desired to be detected is included in the search range, the user can judge that the search range has not been set correctly.

[I. Modification of the Image Processing Device 100]

Figure 14A:
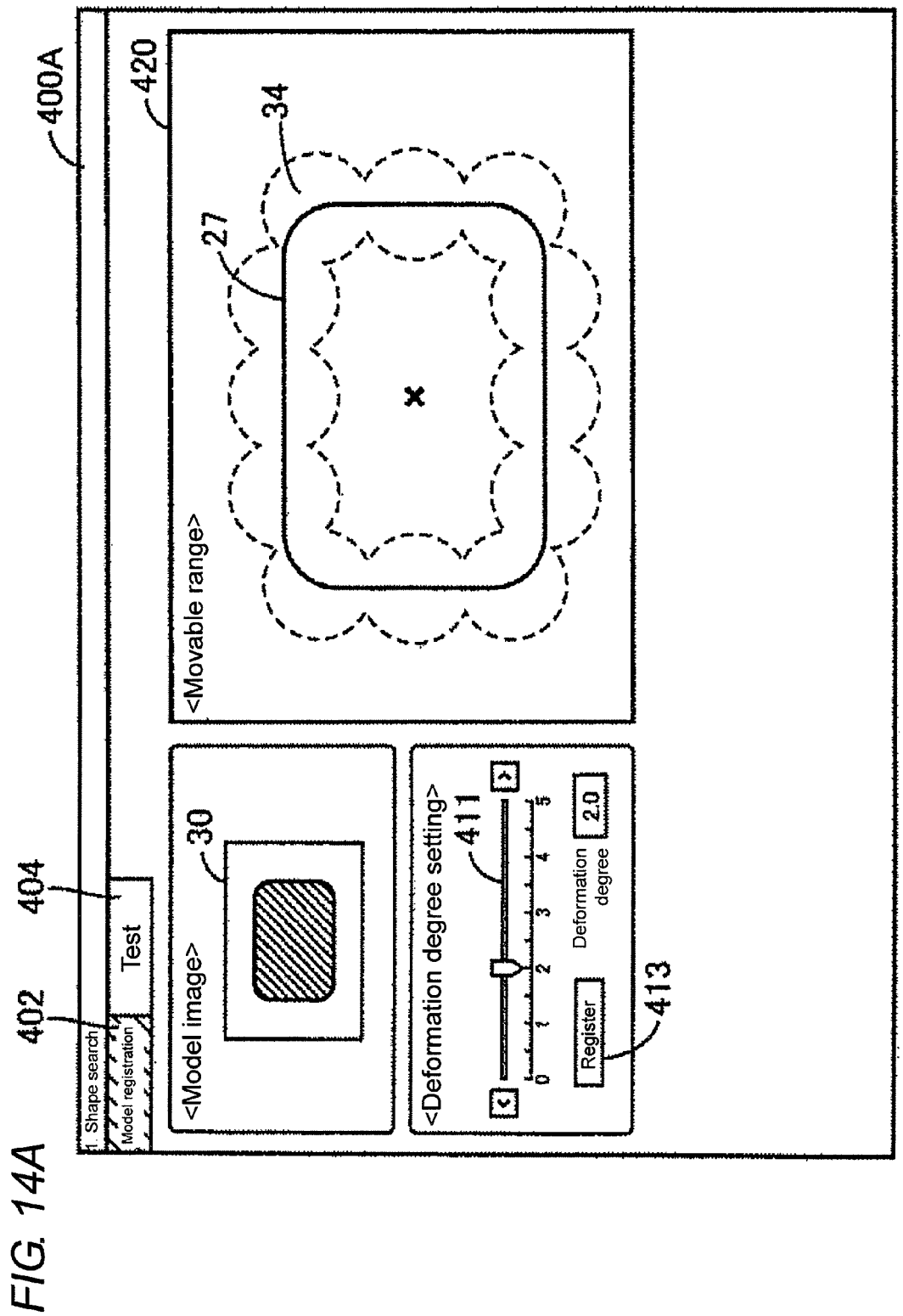
FIGS. 14(A) and 14(B) show an example of a display mode of a setting screen of an image processing device according to a modification.
Figure 14B:
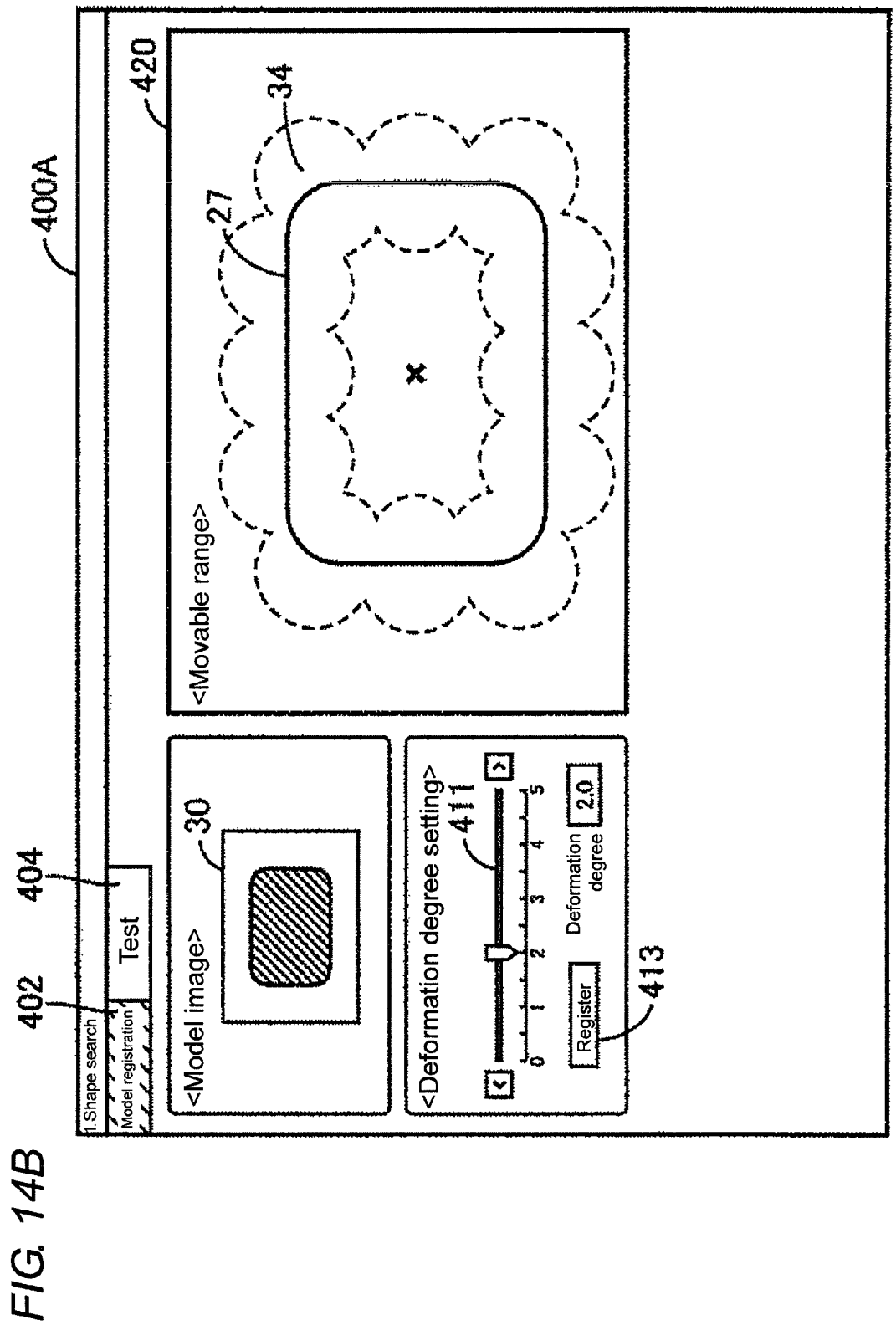

With reference to FIGS. 14(A) and 14(B), a modification of the image processing device 100 will be described. FIGS. 14(A) and 14(B) show an example of a display mode of the setting screen 400A of the image processing device 100 according to the modification.

In the above, description has been made by taking a feature point (the control point 22) as an example of the feature portion. However, the feature portion is not limited to the feature point. For example, the feature portion includes a characteristic region in the model image consisting of a set of the feature points, and a characteristic line in the model image consisting of a set of the feature points, in addition to the feature points included in the model image.

The image processing device 100 determines the search range 34 to a characteristic region (a feature region 27) within the model image 30. That is, the image processing device may provide a search range to a characteristic region such as the feature region 27 and a characteristic line, not only determining a search range to an individual control point. In this case, the image processing device 100 displays a search range set to the feature region 27.

[J. Conclusion]

As described above, because the image processing device 100 according to the embodiment displays, in superposition with the model image, a search range in the size according to the range parameter, the user can intuitively understand the relationship between a permissible degree of deformation to the work to be registered and the range parameter. Accordingly, the user can substantially shorten the time for the parameter setting.

<Second Embodiment>

Hereinafter, a summary of the image processing device 100A according to a second embodiment will be described. The image processing device 100A according to the embodiment is different from the image processing device 100 according to the first embodiment in that the image processing device 100A can set inclination of the edge permissible to each control point. A hardware configuration is the same as that of the image processing device 100 according to the first embodiment. Therefore, repeated description will be avoided.

[K. Summary]

Figure 15A:
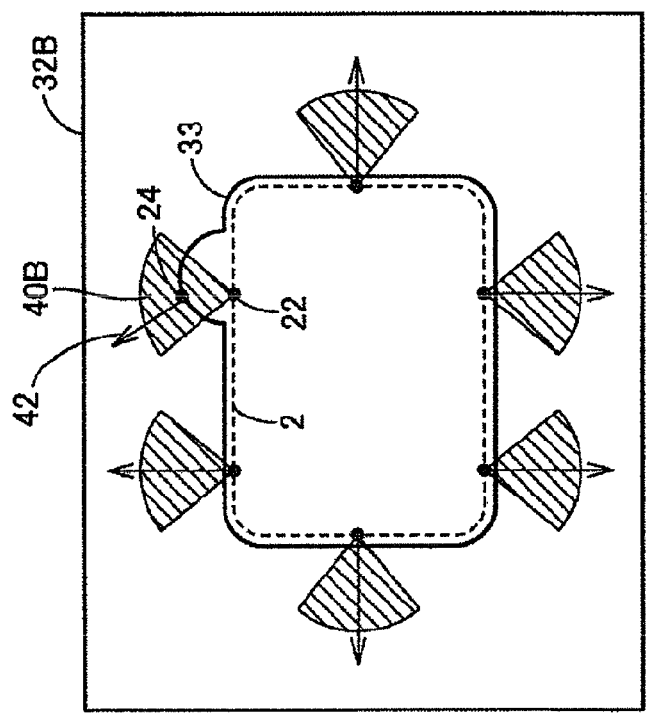
Figure 15B:
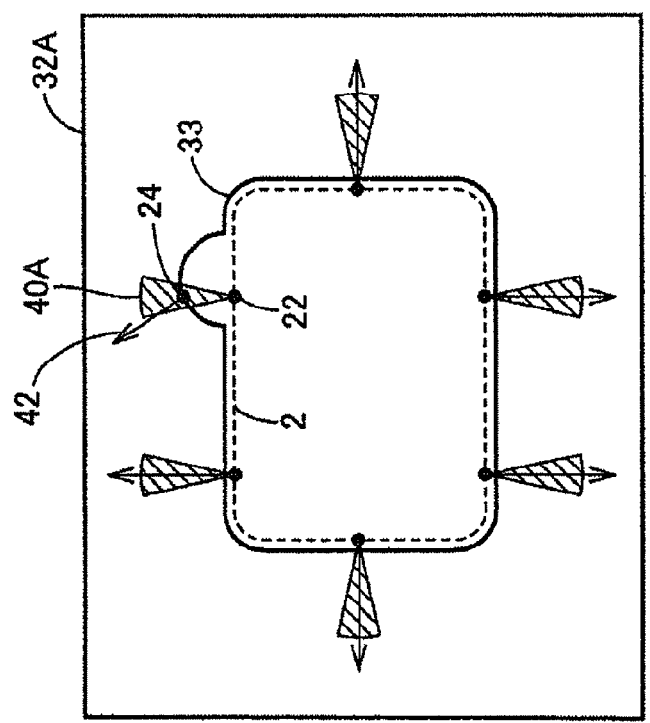
Figure 16A:
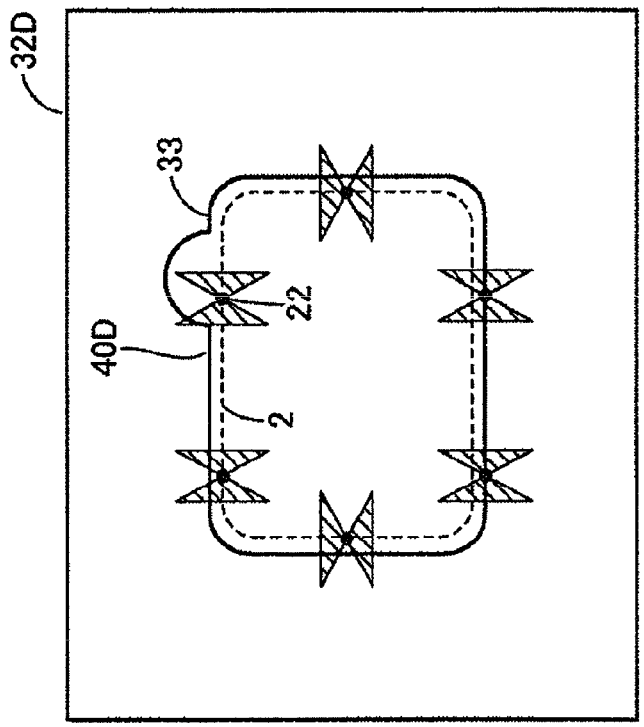
Figure 16B:
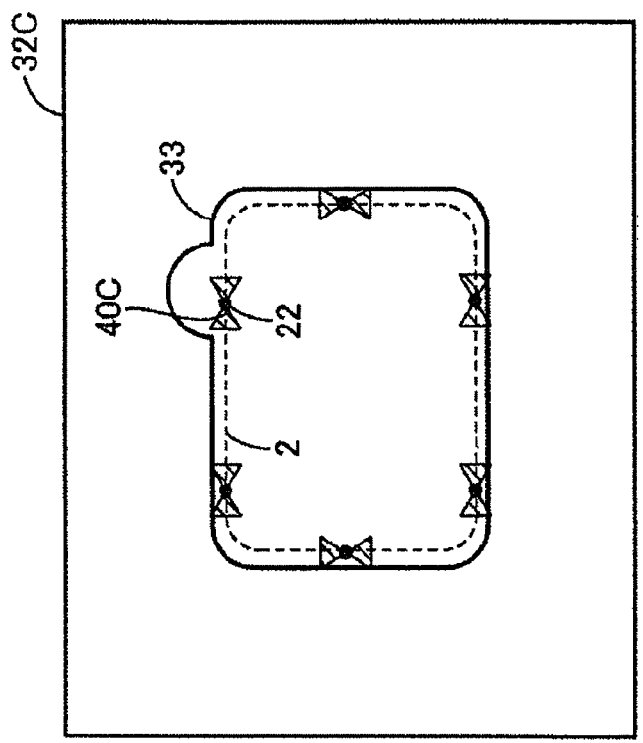

With reference to FIGS. 15(A), 15(B) and FIGS. 16(A), 16(B), the image processing device 100A according to the embodiment will be described. FIGS. 15(A) and 15(B) are explanatory views of a method of providing, in a control point of a model image, a limit to an edge direction to be searched for. FIGS. 16(A) and 16(B) are explanatory views of other method of providing, in a control point of a model image, a limit to an edge direction to be searched for.

Although a shape of the work included in the model image and a shape of the work included in the input image are different to some extent, it is considered that a direction of the edge of the control point of the model image and a direction of the edge of the feature point on the input image corresponding to the control point are basically the same. Focusing attention to this point, the image processing device 100A according to the embodiment can set to each control point included in the model image, a parameter (hereinafter, also referred to as "inclination parameter") for providing a limit to the inclination of the edge in the input image to be searched for.

As an example, FIG. 15(A) shows a state that a range of inclination (hereinafter, also referred to as "inclination range") of the edge of which deformation in the direction of the edge of the control point is permissible is displayed in superposition with an input image 32A. When a feature point in the input image exists within the search range set to the control point 22, and also when the inclination of the edge of the feature point is included within an inclination range 40A, the image processing device 100A regards the feature point as the corresponding point of the control point 22.

For example, an arrowhead 42 directed to a direction perpendicular to the edge direction is displayed at a part (the feature point 24, for example) of the feature points of the input image 32A. Because the displayed arrowhead 42 is not included in the inclination range 40A, the user can confirm that the feature point 24 cannot become the corresponding point of the control point 22. That is, in this case, the image processing device 100A determines the feature point of the input image corresponding to the control point 22 such that an erroneous point which is not the feature point 24 is the corresponding feature point.

In this case, the user can set the inclination range while confirming the inclination range that is displayed in superposition with the input image. For example, as shown in an input image 32B in FIG. 15(B), the user adjusts the inclination parameter so that the arrowhead 42 is included in an inclination range 40B, by making large the parameter (that is, the inclination parameter) for setting the size of the inclination range.

In this way, because the image processing device 100 changes the display of the inclination range by matching the inclination parameter, the user can intuitively understand to what degree of influence the setting parameter of the inclination range gives to the variable shape detection processing. When the inclination parameter has been set correctly, an erroneous point cannot be regarded as the corresponding point. Therefore, even when a work has a shape different from a shape of the registered work, the shape and the position of the work can be detected correctly.

There has been described an example of displaying the inclination range based on a direction perpendicular to the edge direction. Alternatively, as shown in FIGS. 16(A) and 16(B), the image processing device 100A may display the inclination range based on a direction parallel to the edge direction. In this case, the image processing device 100A searches the input image for the surrounding of the control point 22, and searches for a feature point having an edge direction included in an inclination range 40C.

[L. Functional Configuration of the Image Processing Device 100A]

Figure 17:
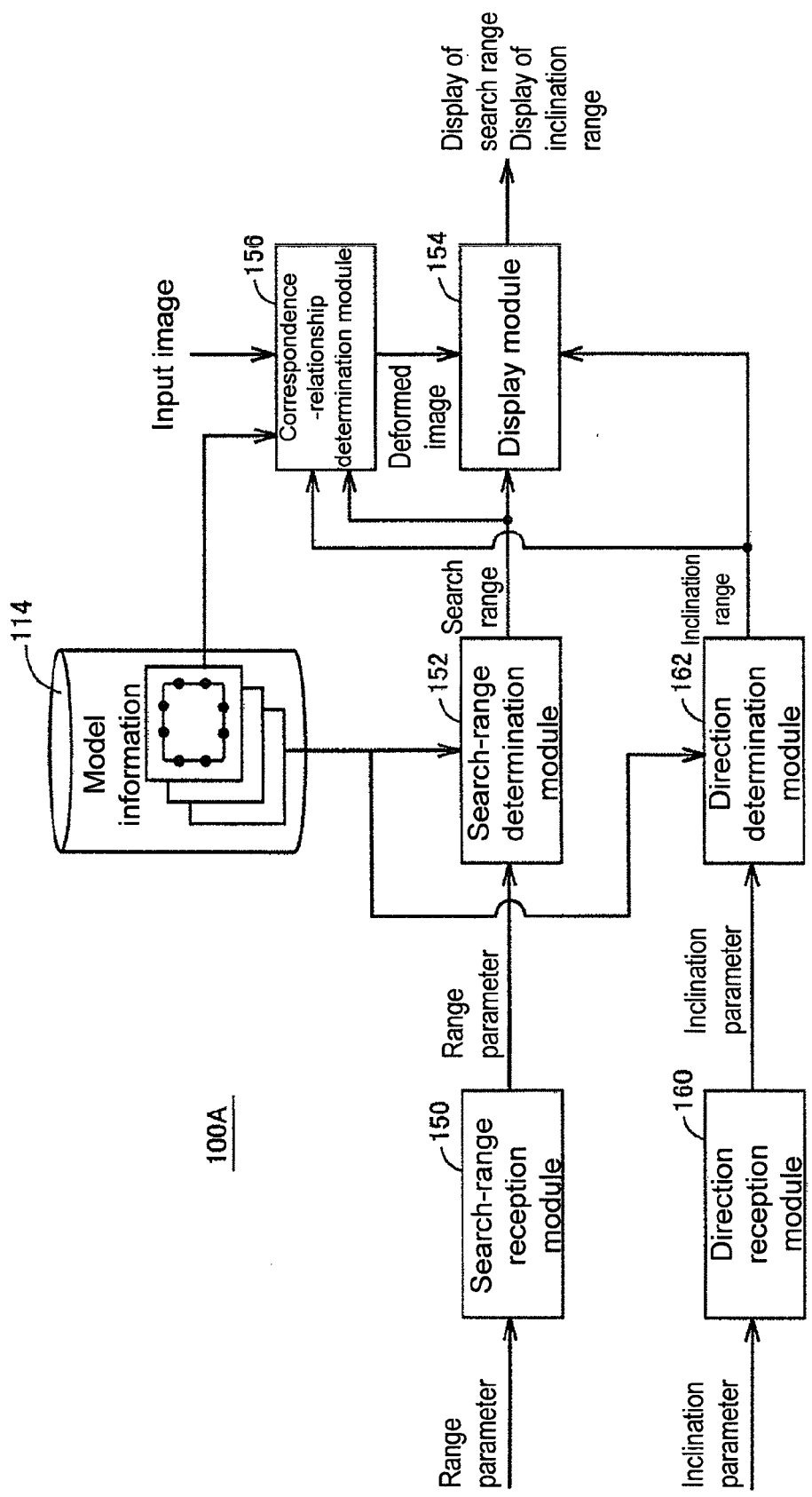
FIG. 17 is a schematic view of a functional configuration of the image processing device according to a second embodiment.

FIG. 17 is a schematic view of a functional configuration of the image processing device 100A according to the embodiment. Each module shown in FIG. 17 is representatively realized by the processor 110 executing the image processing program 116 (both shown in FIG. 17).

In FIG. 17, the image processing device 100A includes, as a functional configuration thereof, the search-range reception module 150, the search-range determination module 152, the display module 154, the correspondence-relationship determination module 156, a direction reception module 160, and a direction determination module 162. However, the correspondence-relationship determination module 156 is optional, and is provided according to the need. The search-range reception module 150 and the search-range determination module 152 are as described above, and repeated description will be avoided.

Concerning the feature point of the model image, the direction reception module 160 receives a parameter (that is, and inclination parameter) indicating a size of inclination of the edge to be searched for in the input image. A detailed method of setting an inclination parameter will be described later. The direction reception module 160 outputs a received inclination parameter to the direction determination module 162.

By using the set inclination parameter, the direction determination module 162 determines a range of relative inclination (that is, the inclination range) of the edge to be searched for in the input image, based on the inclination of the edge of the feature point of the model image. Representatively, the direction determination module 162 sets the inclination range larger when the value of the set inclination parameter is larger, and sets the inclination range smaller when the value of the set inclination parameter is smaller.

The display module 154 displays, in superposition with the model image, a range of relative inclination (that is, the inclination range) of the edge to be searched for determined by the direction determination module 162. Representatively, the display module 154 displays the inclination range linked to the inclination parameter set by the user. A detailed method of displaying the inclination range of the display module 154 will be described later.

By using the set search range and inclination range, the correspondence-relationship determination module 156 determines a correspondence relationship between each feature point of the model image and each feature point of the input image. More specifically, the correspondence-relationship determination module 156 searches the input image for a feature point corresponding to a feature point of the model image within a determined search range, for each of a plurality of feature points of the model image, and also searches the input image for a feature point having an edge direction included in the inclination range. The correspondence-relationship determination module 156 deforms the model image based on the determined correspondence relationship, and generates a deformed image. The correspondence-relationship determination module 156 outputs a generated deformed image to the display module 154.

[M. Test Screen of Inclination Range]

Figure 18A:
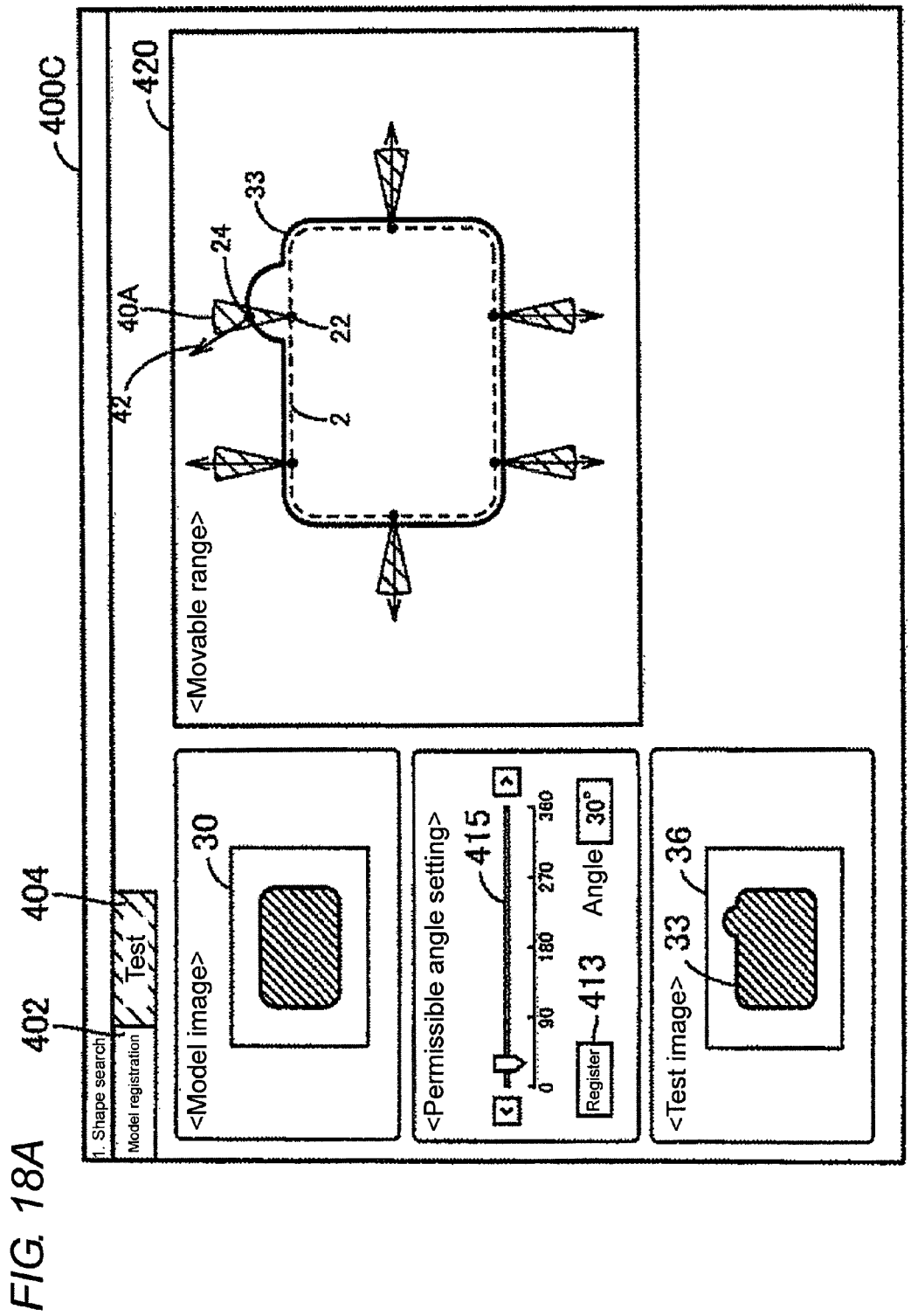
FIGS. 18(A) and 18(B) show a state that an inclination range is displayed in superposition with the test image.
Figure 18B:
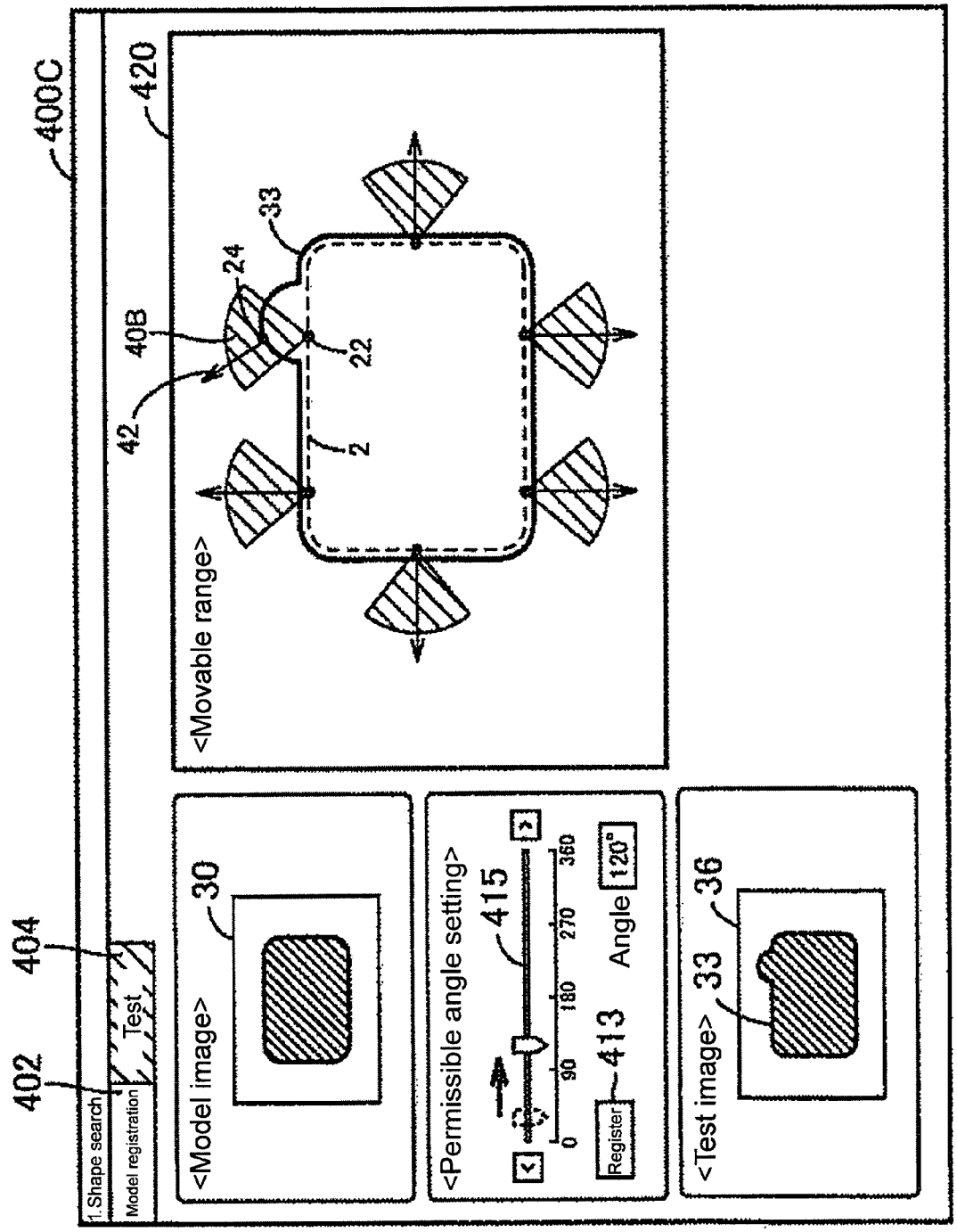

With reference to FIGS. 18(A) and 18(B), a test method for confirming whether an inclination range has been set correctly will be described. FIGS. 18(A) and 18(B) show a test screen 400C for testing a set inclination range. FIGS. 18(A) and 18(B) show a state that an inclination range is displayed in superposition with the test image.

The image processing device 100A displays a set inclination range in superposition with the test image (the input image) so that the user can confirm the inclination range set to the model image. When the user can visually confirm the inclination range, the user can confirm at a glance what degree of deformation is permitted to the work included in the model image.

With reference to FIG. 18(A), a processing procedure for adjusting the inclination range 40A by superposing the inclination range 40A with the test image 36 will be described. When the direction determination module 162 has received the model image 30, the direction determination module 162 determines the control points 22 within the model image 30, and also sets the inclination range 40A to each determined control point 22. The display module 154 displays the determined inclination range 40A in superposition with the model image 30. As a display mode of the inclination range 40A, the display module 154 displays each point of the control points in a fan shape so as to be displayed in the display region 420 of the test screen 400C, for example. When a large number of control points have been detected, superposition of the inclination ranges makes it difficult to look at the inclination ranges. Therefore, the display module 154 may display the inclination range of only a part of the detected control points.

The user can set the parameter (that is, the inclination parameter) for determining a size of the inclination range, by operating a slide bar 415 as the direction reception module 160. The direction determination module 162 determines a size of the inclination range to be displayed in the control point 22 of the model image 30, according to the set inclination parameter. For example, a center angle of a fan-shaped inclination range is determined according to the set inclination parameter. Representatively, the direction determination module 162 sets the center angle of the inclination range 40A larger when the value of the received inclination parameter is larger. The search-range determination module 152 sets the center angle of the inclination range 40A smaller when the value of the received inclination parameter is smaller.

As an example, by operating the slide bar 415 shown in FIG. 18(A) with the mouse or the like, when the user has set the value of the inclination parameter to become larger as shown in FIG. 18(B), the inclination range 40A shown in FIG. 18(A) is displayed such that the center angle becomes large like that of the inclination range 40B shown in FIG. 18(B). In this way, by displaying the inclination range linked to the set inclination parameter value, the user can easily understand the relationship between the inclination parameter and the variation degree of the edge direction. Accordingly, operability of the image processing device 100A can be enhanced, and further, a setting time of the inclination parameter can be substantially shortened.

After setting the inclination parameter, when the user has selected the registration button 413 by mouse operation or the like, the image processing device 100 stores the model image and the inclination range by relating to each other in the recording medium such as the hard disk 114.

The image processing device 100A may be configured to be able to simultaneously set both the search range and the inclination range. That is, the display module 154 links the display of the inclination range 40A to the range parameter and the inclination parameter. At this time, the image processing device 100A changes the display radius of the inclination range 40A according to the range parameter for setting the search range, and changes the center angle of the inclination range 40A according to the inclination parameter for setting the inclination range.

Further, the image processing device 100A may be configured to receive adjustment of a part of the displayed inclination range. In this case, by selecting a part of the displayed inclination range, the user can set the inclination parameter of the selected inclination range.

Further, the display module 154 is not necessarily required to link the display of the inclination range to the slide bar 415, and may change the display of the inclination range according to the change in the inclination parameter. For example, the display module 154 may change the display of the inclination range at the timing the user selects a display button (not shown).

[N. Modification of Setting Screen]

Figure 19:
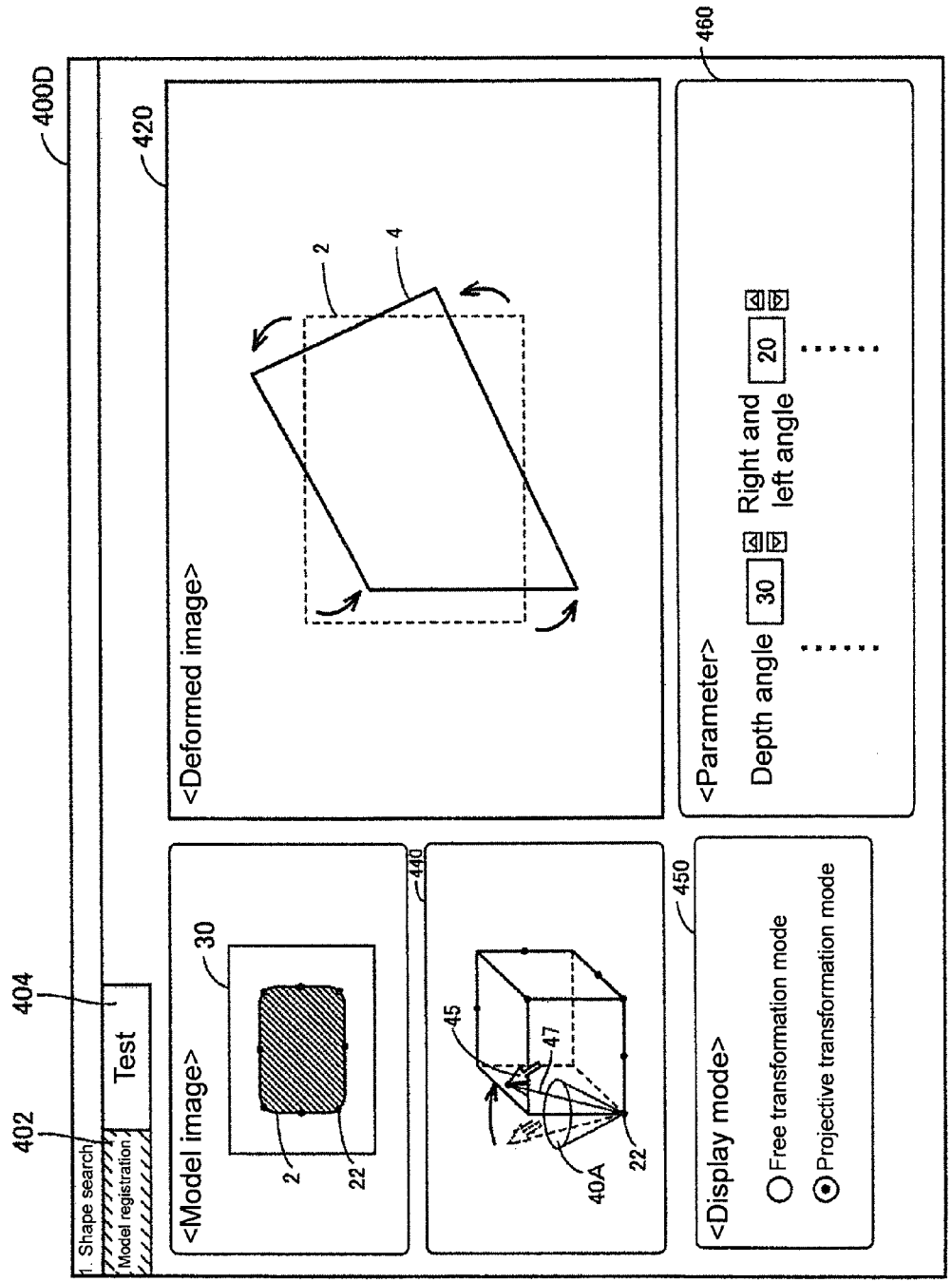
FIG. 19 shows an example of a display mode of a setting screen of a parameter.

Hereinafter, with reference to FIG. 19, a modification of a setting screen of a parameter will be described. FIG. 19 shows an example of a display mode of a setting screen of a parameter.

The image processing device 100A may have a plurality of image transformation modes such as a free transformation mode and a projective transformation mode, for example. The free transformation mode is a mode of transforming an image-captured model image in a two-dimensional space. The projective transformation mode is a mode of transforming an image-captured model image in a three-dimensional space. In this case, the image processing device 100A changes the display of the setting screen for setting the parameter, by matching the transformation mode. When the user has selected the projective transformation mode, a setting screen 400D as shown in FIG. 19 is displayed.

When the transformation mode is the projective transformation mode, the user can set the parameter relating to the projective transformation. Further, the user can set a range to each parameter relating to the projective transformation. The image processing device 100A transforms the model image by considering the set range of the parameter.

As an example, a user interface for setting a parameter relating to the projective transformation is shown in a display region 440 of the setting screen 400D. When the user has selected one of the control points included in the model image, the image processing device 100A can move within the inclination range 40A an arrowhead 47 by operating a cursor 45. The image processing device 100A specifies an angle (such as a depth angle) corresponding to a direction of the arrowhead 47, and calculates a parameter relating to the projective transformation by using the specified angle. The image processing device 100A projection-transforms the model image by using the calculated parameter. At this time, the image processing device 100A displays a transformed image linked to the user operation. At the same time, the image processing device 100A changes in a display region 460 the display of the parameter relating to the calculated projective transformation linked to the user operation.

In this way, by deforming the model image and by changing the display of the parameter according to the user operation, the user can intuitively understand to what degree each value of the parameter relating to the projective transformation contributes to the deformation. By referring to the contribution, the user can easily provide a limit range to each parameter.

[O. Modification of Test Screen]

Figure 20:
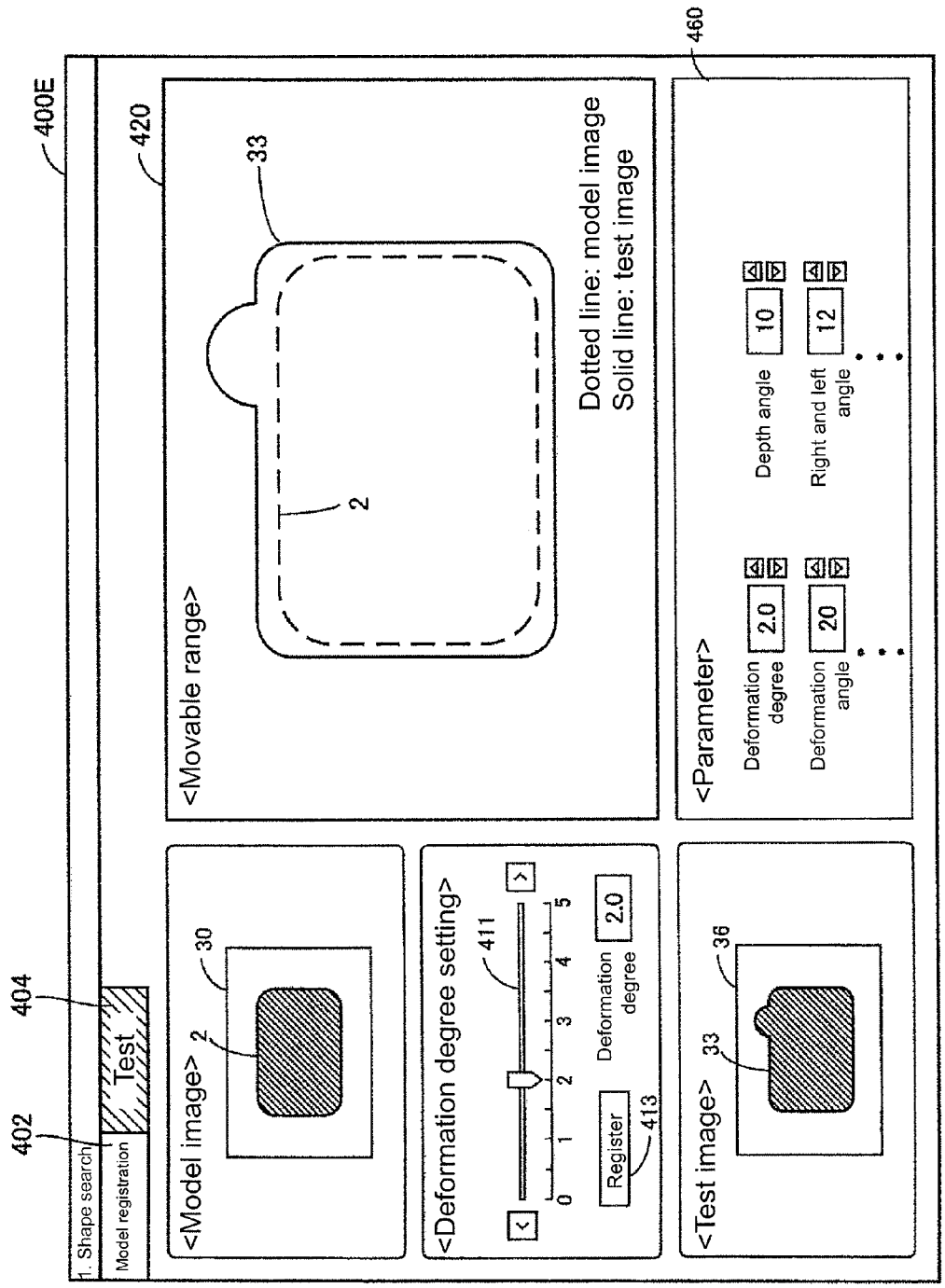
FIG. 20 shows an example of a display mode of a test screen.

Hereinafter with reference to FIG. 20, a modification of a test screen will be described. FIG. 20 shows an example of a display mode of a test screen.

When a test image has been input, the image processing device 100A deforms the model image, by matching the work to be registered included in the model image, with the work to be tested included in the input image. The image processing device 100A displays in a test screen 400E a parameter used for the deformation processing of the model image.

In this way, because the image processing device 100A displays the parameter by matching the kind of the deformation processing, the user can use the display for the reference of setting the range parameter and the inclination parameter. Further, not only the parameters, for example, in the case of deforming the model image by the projective transformation, the user can intuitively understand how to set the parameter relating to the projective transformation in order to detect the shape of the tested work included in the test image. Further, by confirming the parameter displayed in the display region 460, the user may automatically set the parameter relating to the deformation processing. Alternatively, the image processing device 100A may automatically set the deformation parameter that has been output by matching the test image.

It should be considered that the embodiment disclosed this time is an exemplification in all aspects and is not limiting. The scope of the present invention is expressed in claims and not in the above description, and is intended to include all variations in the meaning and the scope equivalent to the claims.

[P. Conclusion]

In the manner as described above, the image processing device 100A according to the embodiment displays, in superposition with the model image, a search angle in the size according to the inclination parameter. Therefore, the user can intuitively understand a permissible degree of deformation to the work to be registered. Accordingly, the user can substantially shorten the time for the parameter setting.

The invention claimed is:

1. An image processing device, comprising:
   a memory configured to hold a feature amount of a feature portion of a model image;
   a processor configured to receive a setting value indicating a size of a search range of searching an input image for a feature amount of the input image corresponding to the feature amount of the model image;
   the processor further configured to determine, by using the setting value, the search range of searching the input image for the feature amount corresponding to the feature amount of the model image; and a display configured to display, in superposition with the model image, the search range determined by the processor.

2. The image processing device according to claim 1, wherein the display is configured to change the display of the search range determined by the processor, according to a change in the setting value.

3. The image processing device according to claim 2, wherein information held by the memory comprises a plurality of feature portions within the model image, the processor is configured to determine a plurality of feature portions on the input image corresponding to the plurality of feature portions of the model image, within search range ranges determined for the plurality of feature portions of the model image, and the display is configured to display an image obtained by deforming the model image according to a correspondence relationship between the plurality of feature portions of the model image and the plurality of feature portions of the input image.

4. The image processing device according to claim 1, wherein the display is configured to display, in superposition with the input image, the search range determined by the processor.

5. The image processing device according to claim 4, wherein information held by the memory comprises a plurality of feature portions within the model image, the processor is configured to determine a plurality of feature portions on the input image corresponding to the plurality of feature portions of the model image, within search ranges determined for the plurality of feature portions of the model image, and the display is configured to display an image obtained by deforming the model image according to a correspondence relationship between the plurality of feature portions of the model image and the plurality of feature portions of the input image.

6. The image processing device according to claim 1, wherein information held by the memory comprises a plurality of feature portions within the model image, the processor is configured to determine a plurality of feature portions on the input image corresponding to the plurality of feature portions of the model image, within search ranges determined for the plurality of feature portions of the model image, and the display is configured to display an image obtained by deforming the model image according to a correspondence relationship between the plurality of feature portions of the model image and the plurality of feature portions of the input image.

7. The image processing device according to claim 6, further comprising:

an adjuster configured to partly adjust the search ranges for searching the input image for the plurality of feature portions corresponding to the plurality of feature portions of the model image.

8. The image processing device according to claim 1, further comprising:

a receiver configured to receive, concerning the feature portion of the model image, the setting value, the setting value indicating a size of inclination of an edge to be searched for in the input image, wherein the processor is configured to determine, by using the setting value received by the receiver, a range of relative inclination of the edge to be searched for in the input image, based on an inclination of an edge of the feature portion of the model image, and the display is configured to display, in superposition with the model image, the range of relative inclination of the edge to be searched for in the input image.

9. The image processing device according to claim 8, wherein the display is configured to change the display of the range of relative inclination of the edge to be searched for in the input image, according to a change in the setting value received by the receiver.

10. The image processing device according to claim 1, wherein the feature amount of the feature portion of the model image includes an edge of a feature portion of a model object included in the model image.

11. The image processing device according to claim 10, wherein the memory is further configured to hold a plurality of control points of the feature portion of the model image, each of the plurality of control points of the model image being disposed on the edge of the feature portion of the model object included in the model image, and the feature amount of the model image is defined by interrelating the plurality of control points of the model image.

12. The image processing device according to claim 11, wherein the processor is configured to extract a plurality of control points for the feature amount of the input image, the plurality of control points of the input image being disposed on an edge of a feature portion of an input object included in the input image, and the feature amount of the input image is defined by interrelating the plurality of control points of the input image.

13. The image processing device according to claim 12, wherein the plurality of control points of the input image are extracted in correspondence with the plurality of control points of the model image.

14. The image processing device according to claim 13, wherein the processor is configured to calculate an interpolation function between the model image and the input image based on a correspondence relationship between the plurality of control points of the input image and the plurality of control points of the model image, and the processor is configured to deform the model image based on the interpolation function.

15. The image processing device according to claim 14, wherein the memory is configured to further hold a detection point set to the model object included in the model image, and the processor is configured to determine a detection point set to the input object included in the input image in correspondence with the detection point set to the model object based on a deformation result of the model image.

16. The image processing device according to claim 15, further comprising:

a robot interface connected to a robot, wherein the robot interface is configured to specify the detection point set to the input object, and the robot is configured to grasp the input object based on the detection point set to the input object.

17. The image processing device according to claim 13, wherein the memory is configured to further hold a detection point set to the model object included in the model image, the processor is configured to calculate an interpolation function between the model image and the input image based on a correspondence relationship between the plurality of control points of the input image and the plurality of control points of the model image, and the processor is configured to determine a detection point set to the input object included in the input image in correspondence with the detection point set to the model object based on the interpolation function.

18. An image processing method, comprising:

holding a feature amount of a feature portion of a model image;

receiving a setting value indicating a size of a search range of searching an input image for a feature amount of the input image corresponding to the feature amount of the model image;

determining, by using the setting value, the search range of searching the input image for the feature amount corresponding to the feature amount of the model image; and displaying, in superposition with the model image, the search range determined by the determining.

19. A non-transitory computer-readable medium storing computer executable instructions that, when executed by a computer, cause the computer to perform operations, the operations comprising:

holding a feature amount of a feature portion of a model image;

receiving a setting value indicating a size of a search range of searching an input image for a feature amount of the input image corresponding to the feature amount of the model image;

determining, by using the setting value, the search range of searching the input image for the feature amount corresponding to the feature amount of the model image; and displaying, in superposition with the model image, the search range determined by the determining.

* * * * *

UNITED STATES PATENT AND TRADEMARK OFFICE
CERTIFICATE OF CORRECTION

PATENT NO.       : 9,508,192 B2
APPLICATION NO.  : 14/602565
DATED            : November 29, 2016
INVENTOR(S)      : Y. Minato et al.

Page 1 of 1

It is certified that error appears in the above-identified patent and that said Letters Patent is hereby corrected as shown below:

In the Claims

Column 19, Line 17 (Claim 3, Line 8) please change "search range ranges" to --search ranges--

Signed and Sealed this
Seventh Day of March, 2017

Michelle K. Lee
*Director of the United States Patent and Trademark Office*